United States Patent
Fukao et al.

(10) Patent No.: US 9,327,793 B2
(45) Date of Patent: May 3, 2016

(54) BICYCLE OPERATING DEVICE

(75) Inventors: Kazutaka Fukao, Sakai (JP); Etsuyoshi Watarai, Izumi (JP); Kentaro Kosaka, Sakai (JP)

(73) Assignee: Shimano Inc., Osaka (JP)

( * ) Notice: Subject to any disclaimer, the term of this patent is extended or adjusted under 35 U.S.C. 154(b) by 852 days.

(21) Appl. No.: 13/251,241

(22) Filed: Oct. 1, 2011

(65) Prior Publication Data

US 2013/0081507 A1 Apr. 4, 2013

(51) Int. Cl.
*F16C 1/10* (2006.01)
*B62K 23/06* (2006.01)
*B62M 25/04* (2006.01)

(52) U.S. Cl.
CPC ................ *B62K 23/06* (2013.01); *B62M 25/04* (2013.01); *Y10T 74/20438* (2015.01)

(58) Field of Classification Search
CPC .... B62M 25/04; B62M 25/045; B62M 25/02; B62L 3/02; Y10T 74/20438
USPC ............. 74/502.2, 502, 489, 501.5 R, 473.14
See application file for complete search history.

(56) References Cited

U.S. PATENT DOCUMENTS

| | | | | |
|---|---|---|---|---|
| 5,732,593 | A * | 3/1998 | Hwang et al. | 74/142 |
| 7,062,989 | B2 * | 6/2006 | Tsumiyama | B62K 23/06 74/489 |
| 7,124,873 | B2 * | 10/2006 | Tsumiyama | B62L 3/023 192/217 |
| 7,437,969 | B2 * | 10/2008 | Ose | 74/502.2 |
| 7,650,813 | B2 * | 1/2010 | Tsumiyama | B62M 25/04 192/217 |
| 7,665,382 | B2 * | 2/2010 | Kawakami | 74/489 |
| 8,181,553 | B2 * | 5/2012 | Tsumiyama | B62K 23/06 74/489 |
| 8,201,477 | B2 * | 6/2012 | Kawakami | B62K 23/06 74/502.2 |
| 8,720,301 | B2 * | 5/2014 | Kawakami | B62M 25/04 74/489 |
| 8,746,105 | B2 * | 6/2014 | Kawakami | B62M 25/04 74/501.6 |
| 9,056,648 | B2 * | 6/2015 | Kawakami | B62K 23/06 |
| 2007/0068312 | A1 * | 3/2007 | Sato | 74/502.2 |
| 2007/0068316 | A1 | 3/2007 | Kawakami et al. | |
| 2007/0137384 | A1 | 6/2007 | Kawakami | |
| 2007/0193389 | A1 | 8/2007 | Kawakami | |
| 2008/0257098 | A1 | 10/2008 | Kawakami | |
| 2009/0090209 | A1 * | 4/2009 | Hara et al. | 74/489 |
| 2009/0158881 | A1 | 6/2009 | Shahana | |
| 2009/0173182 | A1 * | 7/2009 | Watarai et al. | 74/502.2 |
| 2009/0308194 | A1 | 12/2009 | Shahana | |
| 2009/0314117 | A1 | 12/2009 | Kawakami | |
| 2010/0071498 | A1 | 3/2010 | Kawakami | |
| 2010/0199795 | A1 | 8/2010 | Kawakami | |
| 2013/0220058 | A1 * | 8/2013 | Kawakami | B62M 25/04 74/501.6 |
| 2015/0210342 | A1 * | 7/2015 | Fukao | B62K 23/06 74/491 |

FOREIGN PATENT DOCUMENTS

EP 1 764 298 A1 3/2007

* cited by examiner

*Primary Examiner* — Adam D Rogers
(74) *Attorney, Agent, or Firm* — Global IP Counselors

(57) ABSTRACT

A bicycle operating device is provided with a position maintaining arrangement that selectively maintains a movable member in any one of a plurality of holding positions relative to a fixed member. The moving arrangement selectively moves the movable member in a first moving direction from a current holding position to another one of the plurality of holding positions. The first operating member moves in a first operating direction from a rest position to a first end position, and moves in a second operating direction from the rest position to a second end position. The movable member is moved by a different number of the holding positions in the first moving direction when the first operating member moves from the rest position to the first end position as compared to when the first operating member moves from the rest position to the second end position.

15 Claims, 20 Drawing Sheets

BICYCLE OPERATING DEVICE

BACKGROUND

1. Field of the Invention

This invention generally relates to a bicycle operating device. More specifically, the present invention relates to a bicycle operating device having an operating member that is movably mounted with respect to a fixed member in first and second directions.

2. Background Information

Bicycles are often provided with one or more bicycle operating devices for controlling various components of the bicycle. Some bicycles are provided with a drive train having multiple gears that allows the rider to select a particular gear for a particular situation. A bicycle operating device is usually provided for the rider to manually change gears of the drive train. This type of operating devices is often called a bicycle shifter. In most cases, the bicycle operating device is mounted to a part of a handlebar or a frame of the bicycle. Multi-speed bicycle transmissions typically includes a chain, one or more front sprockets or gears mounted to a front crankset and a plurality of rear sprockets or gears mounted to a rear hub of a rear wheel. Thus, two bicycle operating devices (e.g., the shifters) are often used to operate a pair of gear changing devices (e.g., a derailleur or an internal hub gear mechanism) to select a desired gear ratio.

SUMMARY

One aspect present in this disclosure is to provide a bicycle operating device having an operating member that is movably mounted with respect to a fixed member in first and second directions.

In view of the state of the known technology, a bicycle operating device comprises a fixed member, a movable member, a position maintaining arrangement, a moving arrangement and a first operating member. The fixed member is configured to be attached to a bicycle. The movable member is movably coupled to the fixed member. The position maintaining arrangement is operatively arranged with respect to the movable member and the fixed member such that the position maintaining arrangement selectively maintains the movable member in any one of a plurality of holding positions relative to the fixed member. The moving arrangement is operatively coupled to the position maintaining arrangement to selectively move the movable member in a first moving direction such that the movable member moves from a current holding position to another one of the plurality of holding positions. The first operating member is movably mounted with respect to the fixed member such that the first operating member moves in a first operating direction from a rest position to a first end position and such that the first operating member moves in a second operating direction from the rest position to a second end position. The movable member is moved by a first predetermined number of the plurality of holding positions in the first moving direction as the first operating member moves from the rest position to the first end position. The movable member is moved by a second predetermined number of the plurality of holding positions in the first moving direction as the first operating member moves from the rest position to the second end position. The first predetermined number is different from the second predetermined number.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
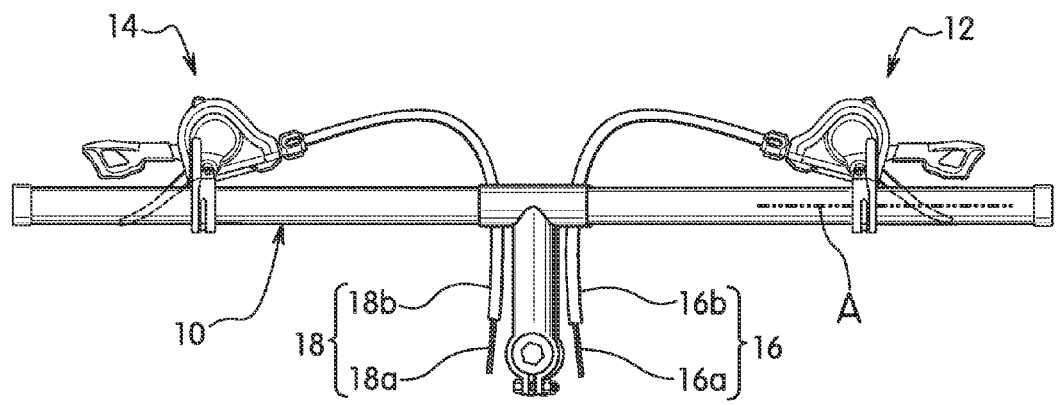
FIG. 1 is a top plan view of a bicycle handlebar that having two bicycle operating devices that are each equipped with an indicator unit in accordance with a first embodiment.

Referring initially to FIG. 1, a bicycle handlebar 10 is illustrated that is provided with a right bicycle operating device 12 and a left bicycle operating device 14 in accordance with a first illustrated embodiment. In the first illustrated embodiment, the bicycle operating device 12 is operatively coupled to one of a first gear changing device (not shown) via a first shift control cable 16, while the bicycle operating device 14 is operatively coupled to a second gear changing device (not shown) via a second shift control cable 18. The gear changing devices are part of a conventional bicycle driving system that is used to shift a bicycle chain for changing speeds of a drive train (not shown) in a relatively conventional manner. Thus, the gear changing devices will not be shown or described herein. However, the bicycle operating devices 12 and 14 can be used for operating other types of bicycle components (e.g., suspension devices) as needed and/or desired Preferably, the shift control cables 16 and 18 are conventional bicycle operating cables that have an outer case covering an inner wire. In other words, each of the shift control cables 16 and 18 is a Bowden type cable that basically includes an inner wire slidably received within an outer case. For example, as seen in FIG. 1, the shift control cable 16 has an inner wire 16*a* with an outer case 16*b* covering the inner wire 16*a*, while the shift control cable 18 has an inner wire 18*a* with an outer case 18*b* covering the inner wire 18*a*.

Also in the illustrated embodiment, the right and left bicycle shifters 12 and 14 are essentially identical in operation, except that they are mirror images of each other, and they may have a different number of shift operations. In other words, the left bicycle shifter 14 is identical to the right bicycle shifter 12, except for the left bicycle shifter 14 has been modified to be a mirror image and the number of gears that can be shifted has been changed. Thus, for the sake of brevity, only the right bicycle shifter 12 will be discussed and illustrated herein.

Figure 2:
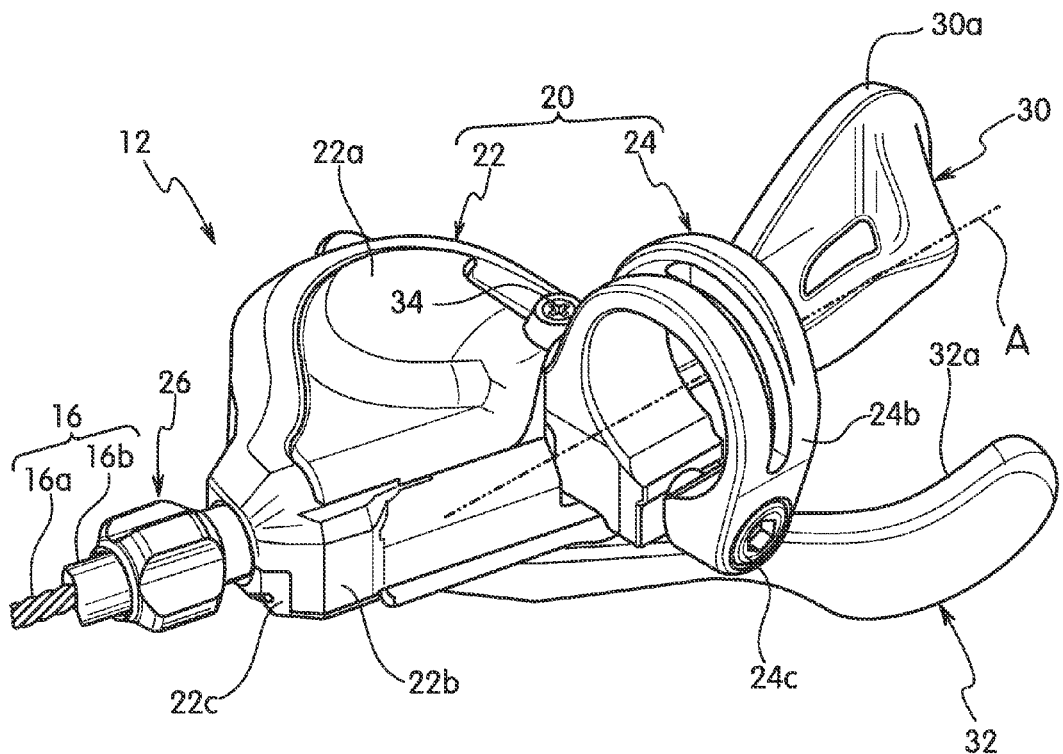
FIG. 2 is a top perspective view of the right bicycle operating device illustrated in FIG. 1.
Figure 3:
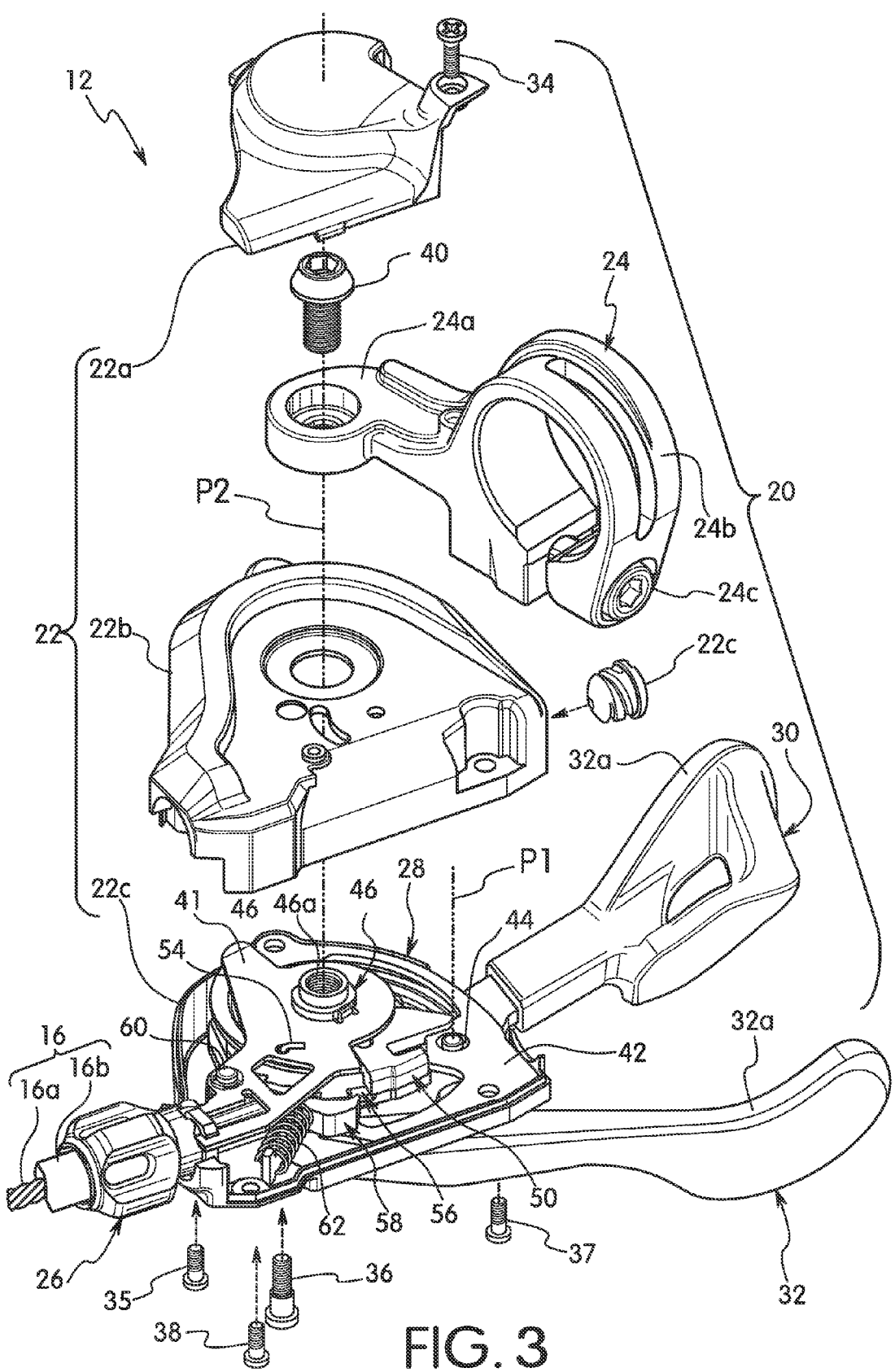
FIG. 3 is a partially exploded perspective view of the right bicycle operating device illustrated in FIGS. 1 and 2.

As seen in FIGS. 2 and 3, the bicycle operating device 12 is provided with a fixed member 20 that includes a housing 22 and a tubular mounting member 24 The fixed member 20 is configured to be attached to a part of a bicycle such as, for example, the handlebar 10 as seen in FIG. 1. Preferably, a cable adjusting unit 26 is mounted to the housing 22 in a conventional manner. The bicycle operating device 12 is further provided with a shift unit 28 that is operated by a first operating member 30 and a second operating member 32, as described below. While the bicycle operating device 12 is provided with the first and second operating members 30 and 32, as shown, in certain situations, the bicycle operating device 12 can be used with only the first operating member 30.

As seen in FIG. 3, in the illustrated embodiment, the housing 22 includes a cover 22*a*, a top housing part 22*b* and a bottom housing part 22*c*. Preferably, an access plug 22*d* is provided to aid in the attachment of the inner wire 16*a* to the shift unit 28. The cover 22*a*, the top housing part 22*b*, the bottom housing part 22*c* and the access plug 22*d* are preferably made of a hard, rigid material such as a rigid plastic material. In the illustrated embodiment, the cover 22*a*, the top housing part 22*b*, the bottom housing part 22*c* and the access plug 22*d* are each formed by injection molding. The cover 22*a* is releasably attached to the tubular mounting member 24 by a single screw 34. The top housing part 22*b* is releasably fastened to the bottom housing part 22*c* by four screws 35, 36, 37 and 38. Since the precise construction of the housing 22 will vary depending on its application, the housing 22 will not be discussed or illustrated in further detail herein.

The tubular mounting member 24 is attached to the housing 22 by a bolt 40, which is threaded into the shift unit 28. The bolt 40 is covered by the cover 22*a*. In the illustrated embodiment, as best seen in FIG. 2, the tubular mounting member 24 has a curved clamping surface that defines a handlebar clamping or mounting axis A. The tubular mounting member 24 basically includes a housing attachment portion 24*a*, a split band portion 24*b* and a tightening screw 24*c*. The tubular mounting member 24 is conventional structure that is commonly used with bicycle operating devices. Thus, for the sake of brevity, the tubular mounting member 24 will not be discussed or illustrated in further detail herein.

Figure 4:
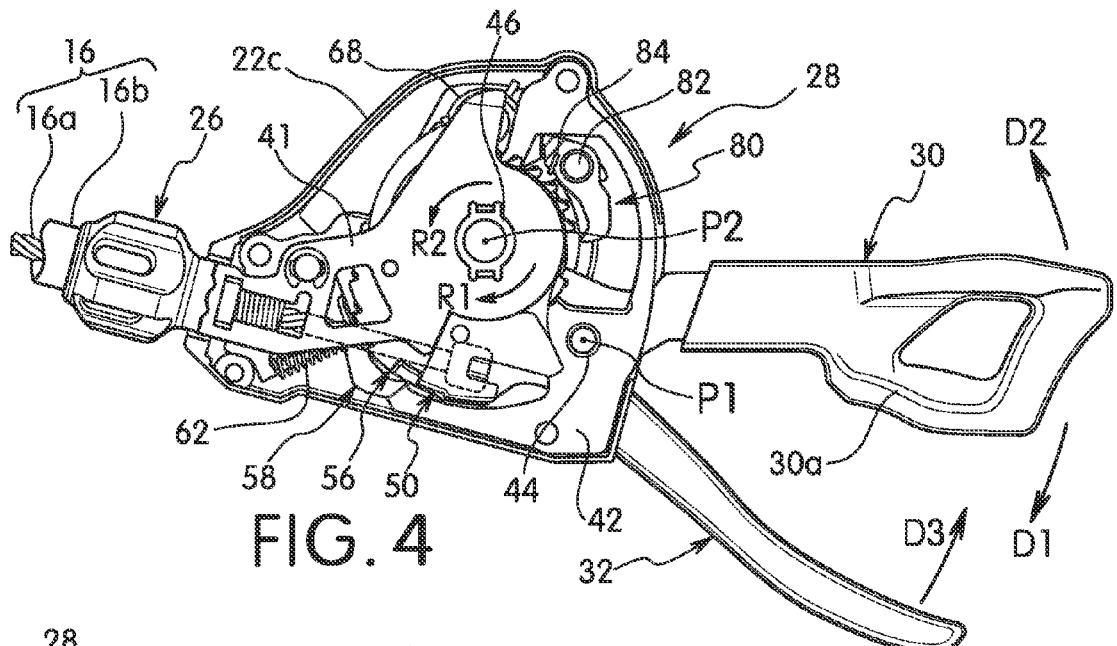
FIG. 4 is a top plan view of the right bicycle operating device illustrated in FIGS. 1 to 3, but with the top housing part of the shifter housing and the clamp removed.
Figure 5:
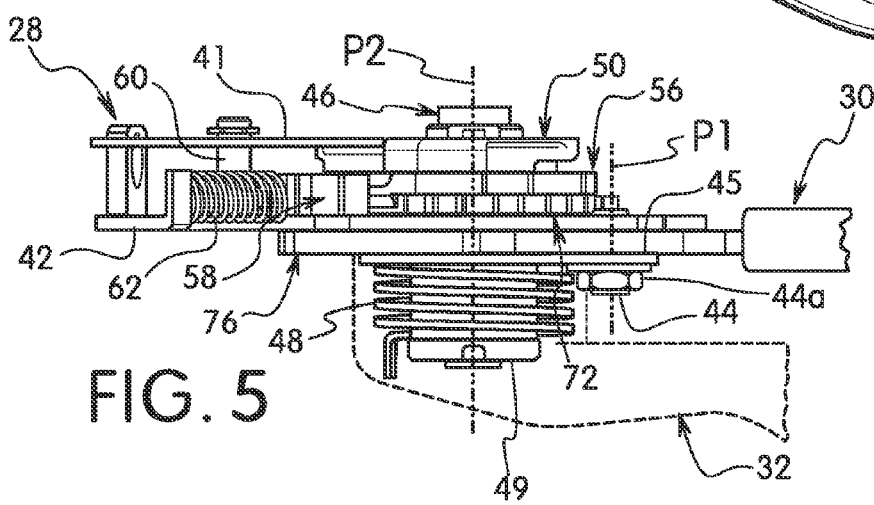
FIG. 5 is a side elevational view of the right bicycle operating device illustrated in FIGS. 1 to 5, but with selected parts removed.
Figure 6:
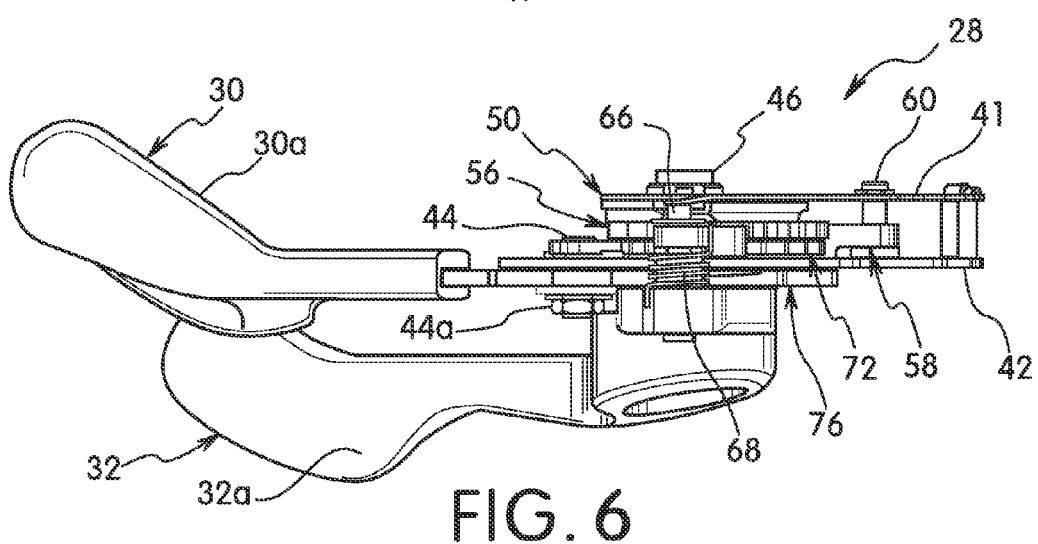
FIG. 6 is another side elevational view of the right bicycle operating device illustrated in FIGS. 1 to 5, but with selected parts removed.
Figure 7:
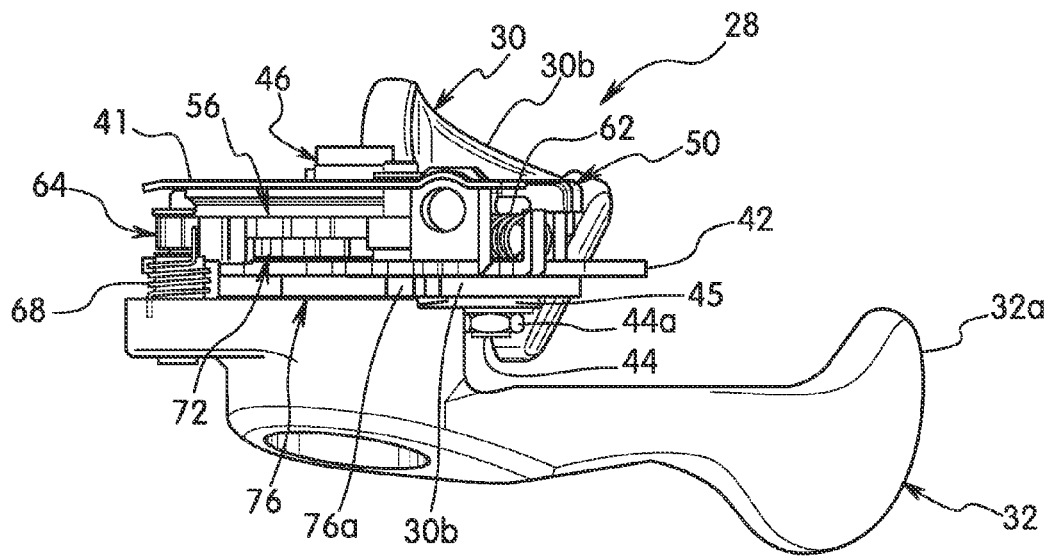
FIG. 7 is still another side elevational view of the right bicycle operating device illustrated in FIGS. 1 to 5, but with selected parts removed.
Figure 8:
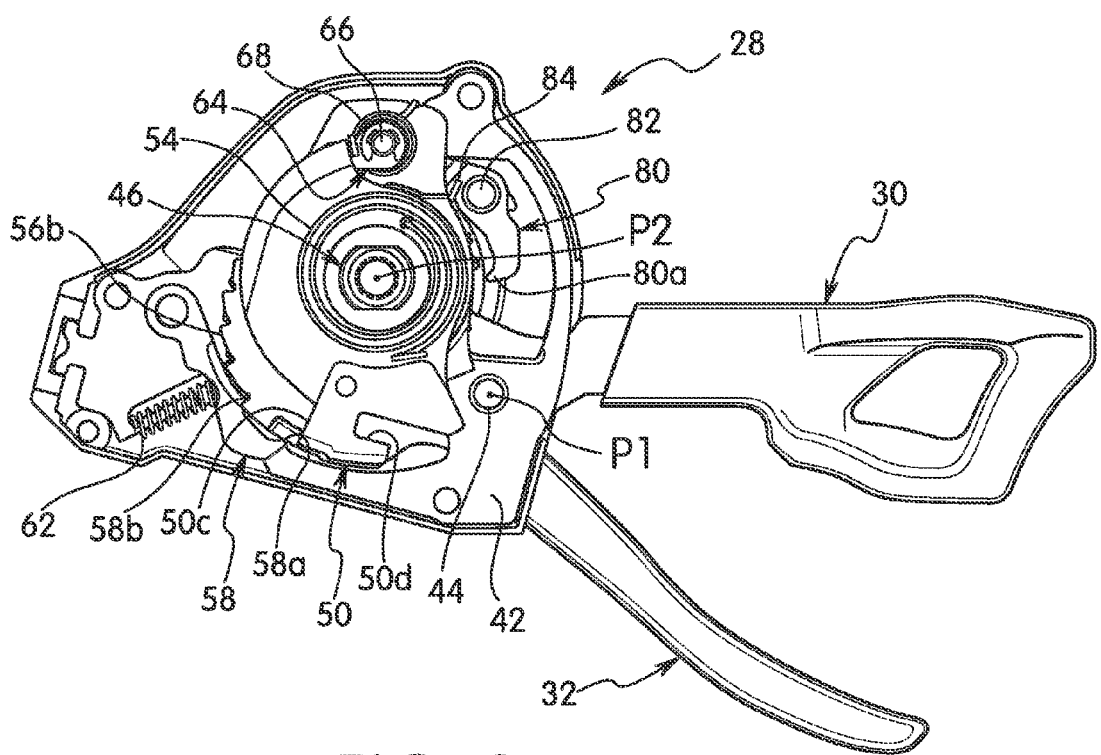
FIG. 8 is a top plan view of the right bicycle operating device illustrated in FIGS. 1 to 5, but with selected parts removed to show the top of the wire takeup member (i.e., a movable member) of the position maintaining arrangement.

Referring now to FIGS. 4 to 16, the shift unit 28 and its connections to the first and second operating members 30 and 32 will now be discussed in further detail. The shift unit 28 is supported within the housing 22 by a stationary top support plate 41 and a stationary bottom support plate 42 as seen in FIGS. 4 to 7. The cable adjusting unit 26 is attached to the housing 22 by the top and bottom support plates 41 and 42 as seen in FIGS. 3 and 4. The shift unit 28 includes a pivot pin 44 that is fixed to the bottom support plate 42 for pivotally supporting the first operating member 30 to the housing 22 of the fixed member 20 as seen in FIG. 5. The bottom portion of the pivot pin 44 is threaded for threadedly receiving a nut 44*a* to retain the first operating member 30 on the bottom support plate 42 as seen in FIGS. 5 and 6. An additional support plate 45 is attached to the lower end of the pivot pin 44 to stabilize the lower end of the pivot pin 44.

Figure 16:
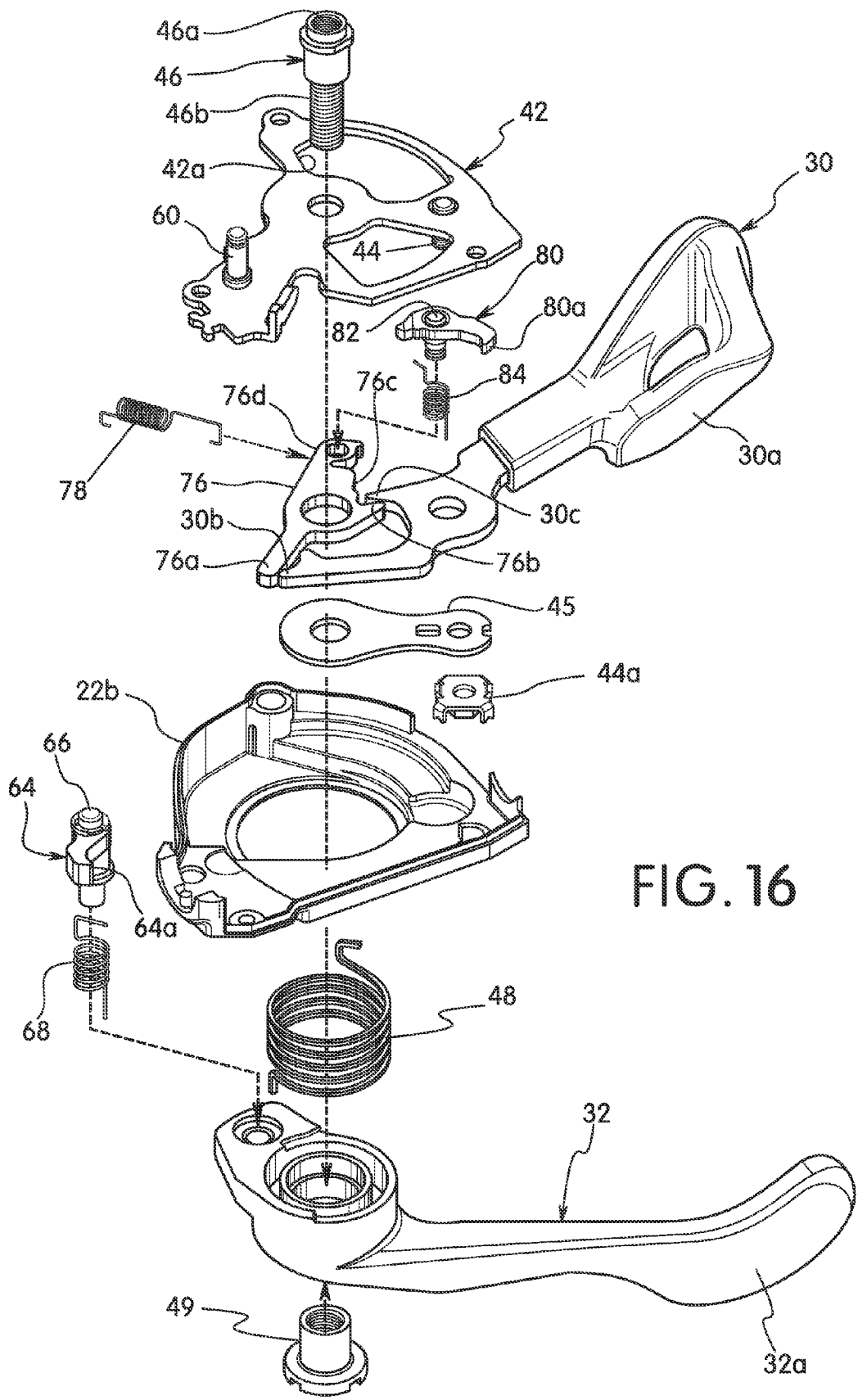
FIG. 16 is an exploded perspective view of selected parts of the moving arrangement and the operating members of the right bicycle operating device illustrated in FIGS. 1 and 2.

The shift unit 28 includes a main pivot shaft 46 that is fixed between the top and bottom support plates 41 and 42 for pivotally supporting the second operating member 32 to the housing 22 of the fixed member 20. The main pivot shaft 46 is non-rotatably mounted to the top and bottom support plates 41 and 42. The additional support plate 45 is also attached to the main pivot shaft 46 for stabilizing the lower end of the pivot pin 44 as seen in FIGS. 5 and 16. As seen in FIGS. 3 and 16, the main pivot shaft 46 has a threaded bore 46*a* at its upper end for threadedly receiving the bolt 40. As seen in FIG. 16, the main pivot shaft 46 has an externally threaded portion 46*b* for threadedly receiving a nut 49 that secures the second operating member 32 to the main pivot shaft 46. The main pivot shaft 46 has a plurality of bushings (not shown) so that various parts rotate smoothly on the main pivot shaft 46 and a plurality of washers (not shown) for providing an appropriate axial spacing of the various parts on the main pivot shaft 46.

As a result, the first and second operating members 30 and 32 are movably mounted to the fixed member 20 for operating the shift unit 28. In particular, the first operating member 30 is pivotally mounted to the fixed member 20 such that the first operating member 30 pivots around a first pivot axis P1 that is defined by the pivot pin 44. The second operating member 32 is pivotally mounted to the fixed member 20 such that the second operating member 32 pivots around a second pivot axis P2 that is defined by main pivot shaft 46. The second pivot axis P2 is parallel to the first pivot axis P1, but offset from the first pivot axis P1.

In the illustrated embodiment, the first and second operating members 30 and 32 are trigger type levers that are biased to the rest positions (FIGS. 4 to 16). For example, the second operating member 32 is provided with a return spring 48 that is coupled between the second operating member 32 and a stationary part of the shift unit 28. The first operating member 30 is return to its rest position as will be explained later. The term "rest position" as used herein refers to a state in which a movable part (e.g., the first and second operating members 30 and 32) remains stationary without the need of a user holding the part in that state corresponding to the rest position. The term "end position" as used herein refers a state in which a movable part (e.g., the first and second operating members 30 and 32) is prevent from be moved further in a movement direction of a movement stroke of that part.

In the illustrated embodiment, the first operating member 30 pivots relative to the fixed member 20 from its rest position around the first pivot axis P1 in both a first operating direction D1 and a second operating direction D2 (FIG. 4). The first operating direction D1 is opposite to the second operating direction D2 with respect to the first pivot axis P1. In the illustrated embodiment, the first operating member 30 operates the shift unit 28 to release the inner wire 16a with respect to the fixed member 20 as the first operating member 30 is pivoted from the rest position in either of the first operating direction D1 or the second operating direction D2.

The first pivot axis P1 of the first operating member 30 is arranged relative to the handlebar mounting axis A of the tubular mounting member 24 such that a rider actuating portion 30a of the first operating member 30 moves closer to the handlebar mounting axis A of the tubular mounting member 24 as the first operating member 30 is moved from the rest position in the first operating direction D1. Also the first pivot axis P1 of the first operating member 30 is arranged relative to the handlebar mounting axis A of the tubular mounting member 24 such that a rider actuating portion 30a of the first operating member 30 moves away from the handlebar mounting axis A of the tubular mounting member 24 as the first operating member 30 is moved from the rest position in the second operating direction D2.

In the illustrated embodiment, as seen in FIG. 4, the bicycle shifter 12 includes a wire takeup member 50, which is a part of the shift unit 28 that moves with the inner wire 16a. The wire takeup member 50 is movably coupled to the fixed member 20 by a main pivot shaft 46 that defines the second pivot axis P2. The main pivot shaft 46 can be a single part or constructed of several parts including various bushings and washers, as need and/or desired. Thus, the wire takeup member 50 is mounted on the second pivot axis P2 that is offset from the first pivot axis P1 of the first operating member 30. The wire takeup member 50 constitutes one example of a movable member of the shift unit 28. Other parts of the shift unit 28 that move as the inner wire 16a moves can also constitute a movable member of the shift unit 28.

In the illustrated embodiment, the second operating member 32 pivots relative to the fixed member 20 from its rest position around the second pivot axis P2 only in a third direction D3 with respect to the second pivot axis P2. The second operating member 32 has a rider actuating portion 32a that is disposed outside of the housing 22. Thus, both the wire takeup member 50 and the second operating member 32 are pivotally mounted on the second pivot axis P2 that is offset from the first pivot axis P1 of the first operating member 30. In the illustrated embodiment, the second operating member 32 operates the shift unit 28 to pull the inner wire 16a with respect to the fixed member 20 as the second operating member 32 is pivoted from the rest position in the third operating direction D3 (FIG. 4).

Figure 9:
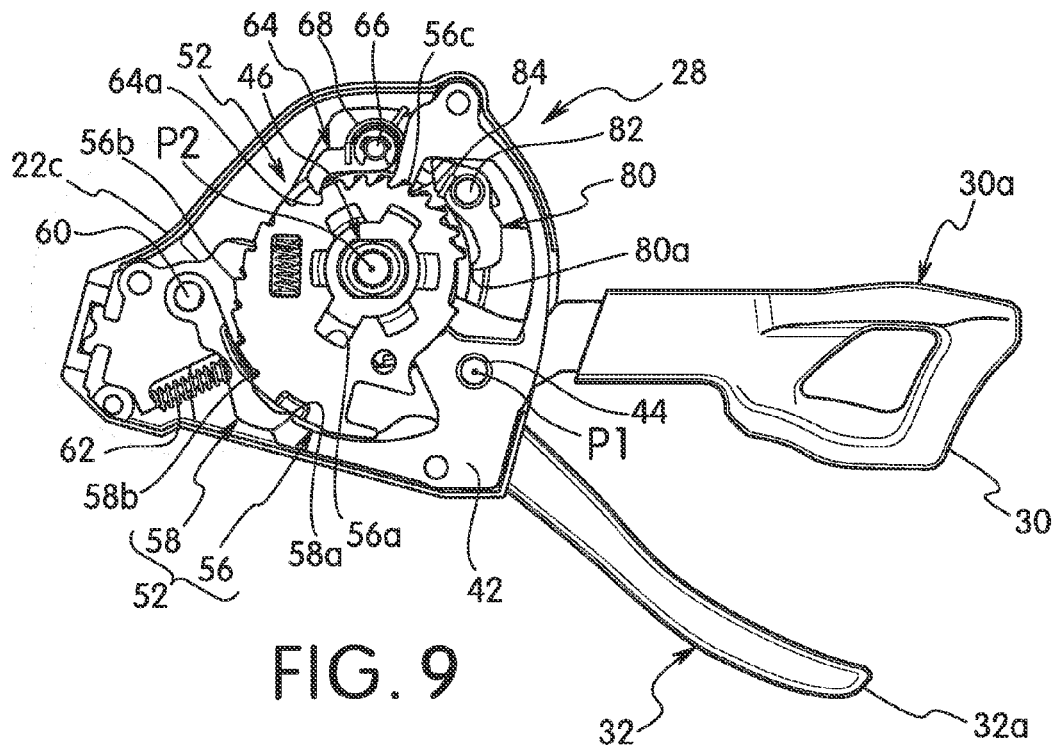
FIG. 9 is a top plan view of the right bicycle operating device illustrated in FIGS. 1 to 5, but with selected parts removed to show the top of the positioning member of the position maintaining arrangement.
Figure 10:
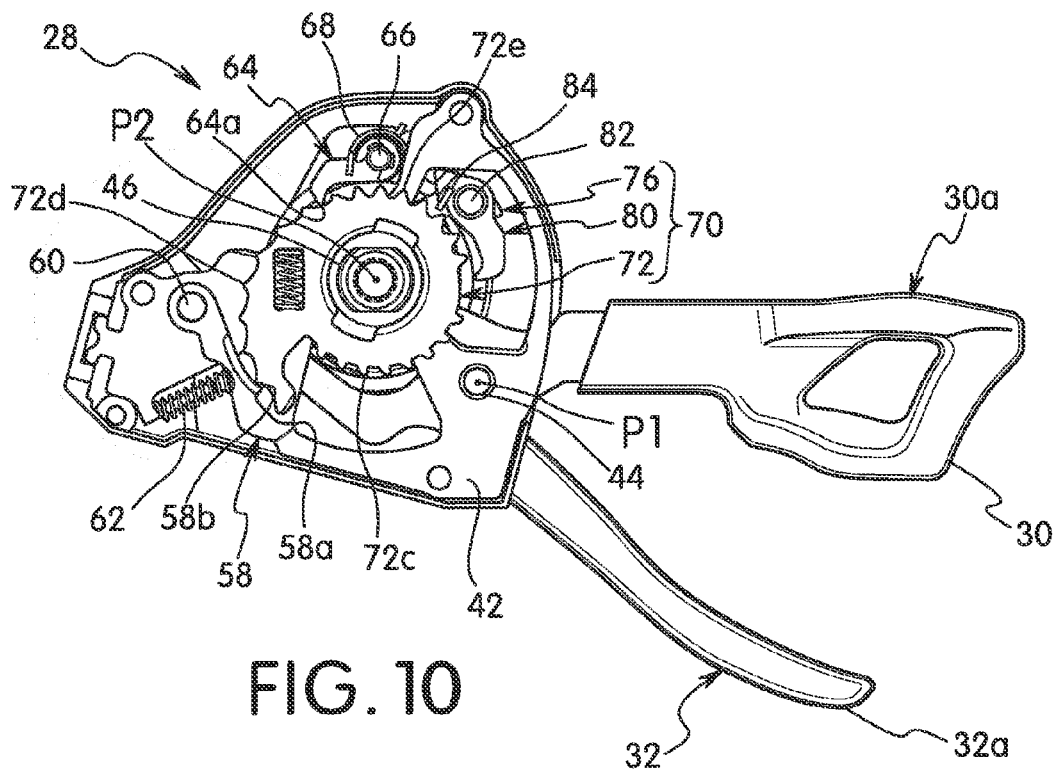
FIG. 10 is a top plan view of the right bicycle operating device illustrated in FIGS. 1 to 5, but with selected parts removed to show the top of the release member.

In the illustrated embodiment, as seen in FIG. 9, the shift unit 28 is a cable operated unit, which typically includes a position maintaining arrangement 52 that controls the position of the wire takeup member 50 in response to operation of the first and second operating members 30 and 32. The first operating member 30 is operatively coupled to the position maintaining arrangement 52 to move the wire takeup member 50 in a first moving direction R1 (FIG. 4), as the first operating member 30 moves relative to the fixed member 20. Thus, the wire takeup member 50 rotates in the first moving direction R1 to release the inner wire 16a from the housing 22 of the fixed member 20. The second operating member 32 is operatively coupled to the position maintaining arrangement 52 to move the wire takeup member 50 in a second moving direction R2 (FIG. 4), which is opposite to the first moving direction R1, as the second operating member 32 moves relative to the fixed member 20. Thus, the wire takeup member 50 rotates in the second moving direction R2 to pull the inner wire 16a into the housing 22 of the fixed member 20. The wire takeup member 50 is biased in the first moving direction R1 with respect to the housing 22 of the fixed member 20 by a biasing element 54 (e.g., a torsion spring).

The biasing element 54 has one end disposed in a hole in the top surface of the wire takeup member 50 and the other end hooked on to the top support plate 41 to bias in the wire takeup member 50 in the first moving direction R1 with respect to the housing 22 of the fixed member 20. Thus, in the illustrated embodiment, the first moving direction R1 corresponds to a wire releasing direction, and the second moving direction R2 corresponds to a wire pulling direction.

The wire takeup member 50 is preferably a one-piece, unitary member formed from a rigid material such as a hard plastic material. The wire takeup member 50 has a center bore 50a that receives the main pivot shaft 46 for rotatably mounting the wire takeup member 50 to the housing 22 of the fixed member 20. The wire takeup member 50 also has a plurality of projections 50b that surrounds the center bore 50a and extend downward from the bottom surface of the wire takeup member 50. The top surface of the wire takeup member 50 is also provided with an abutment 50c that contacts an edge of the top support plate 41 when the wire takeup member 50 is in the fully released position as seen in FIG. 4. In other words, the biasing element 54 biases the abutment 50c of the wire takeup member 50 against the edge of the top support plate 41 when the wire takeup member 50 is in the fully released position as seen in FIG. 4. In this way, the edge of the top support plate 41 an abutment for limiting rotation of the wire takeup member 50 in the first moving direction R1. In addition, the wire takeup member 50 also has a wire attachment structure 50d for attaching the nipple of the inner wire 16a as seen in FIG. 4. The wire takeup member 50 is preferably a reel shaped member with a curved peripheral surface that engages the inner wire 16a.

The position maintaining arrangement 52 (FIG. 9) is operatively arranged with respect to the wire takeup member 50 and the fixed member 20 such that the position maintaining arrangement 52 selectively maintains the wire takeup member 50 in any one of a plurality of holding positions relative to the fixed member 20. In the illustrated embodiment, the position maintaining arrangement 52 basically includes a positioning member or ratchet 56 and a positioning pawl 58. The positioning member 56 is fixed to the wire takeup member 50 so that they move together as a unit.

Figure 11:
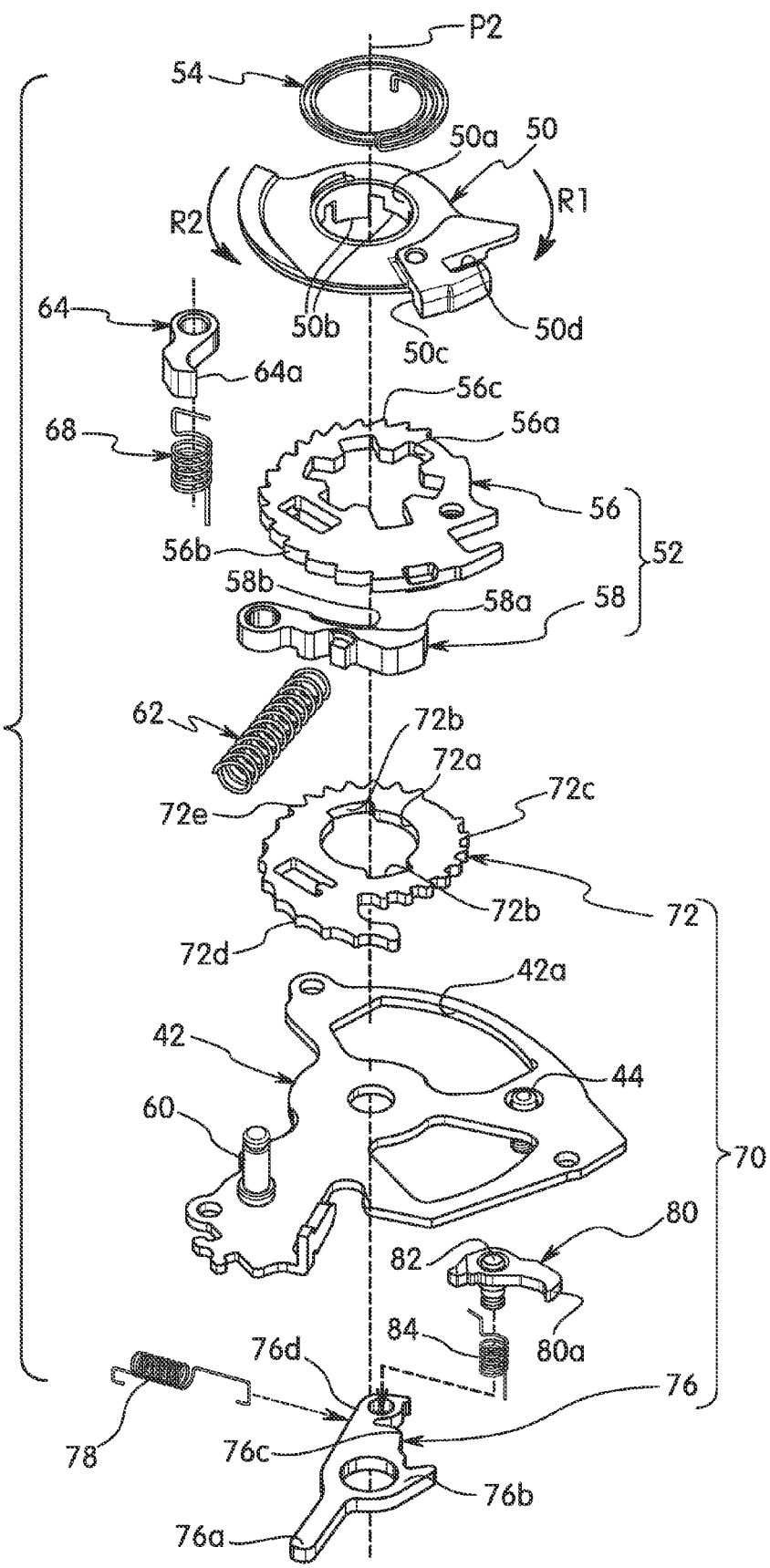
FIG. 11 is an exploded perspective view of selected parts of the position maintaining arrangement of the right bicycle operating device illustrated in FIGS. 1 to 5.
Figure 12:
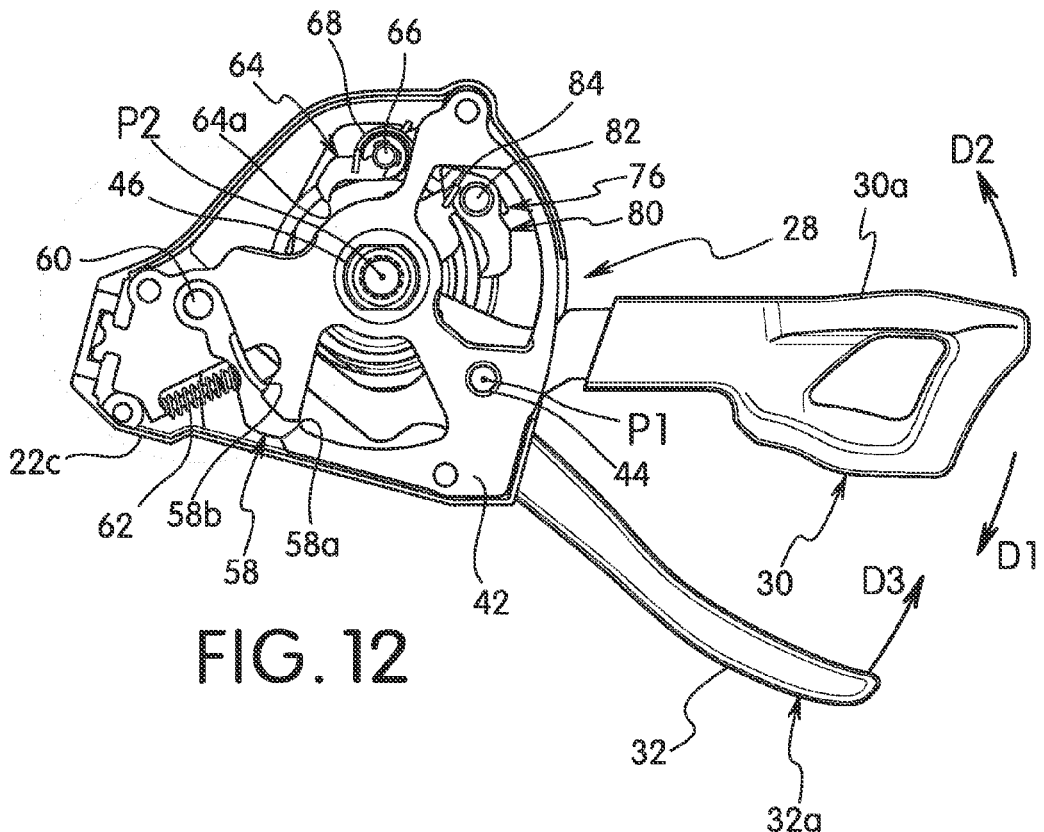
FIG. 12 is a top plan view of the right bicycle operating device illustrated in FIGS. 1 to 5, but with selected parts removed to show the mounting arrangement of the first operating member.
Figure 13:
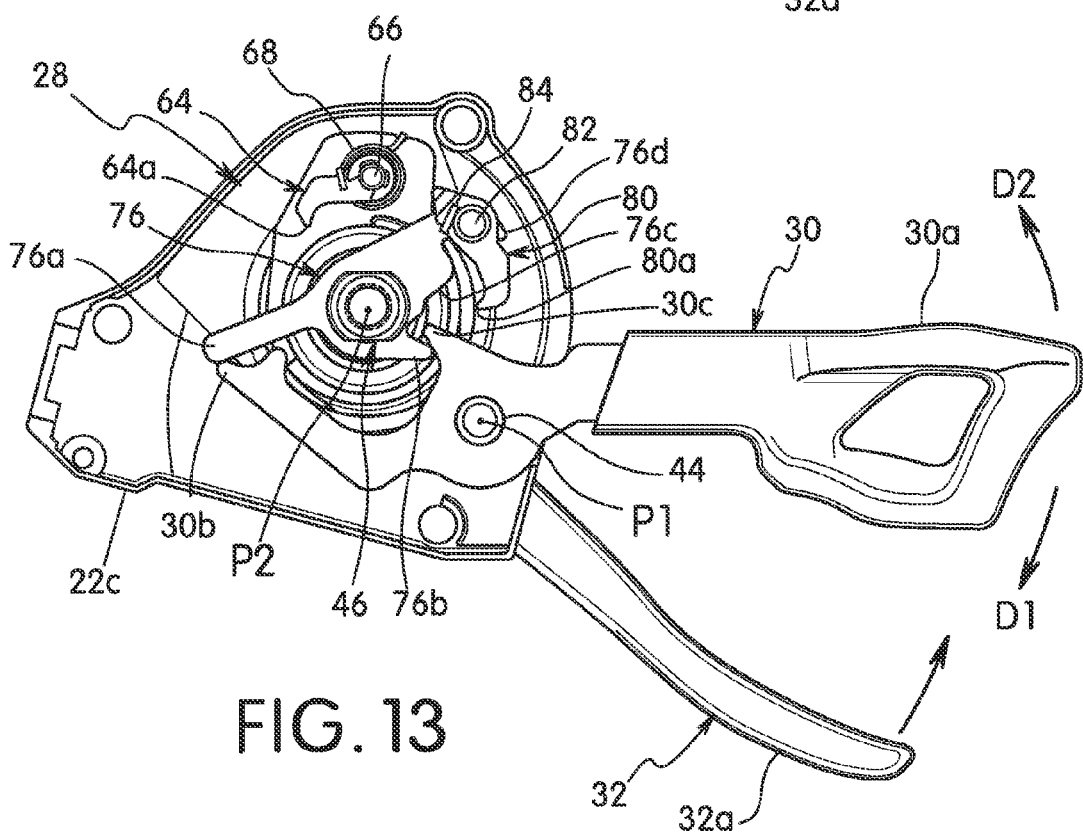
FIG. 13 is a top plan view of the right bicycle operating device illustrated in FIGS. 1 to 5, but with selected parts removed to show the relationship between the control member and the first operating member in their rest positions.
Figure 14:
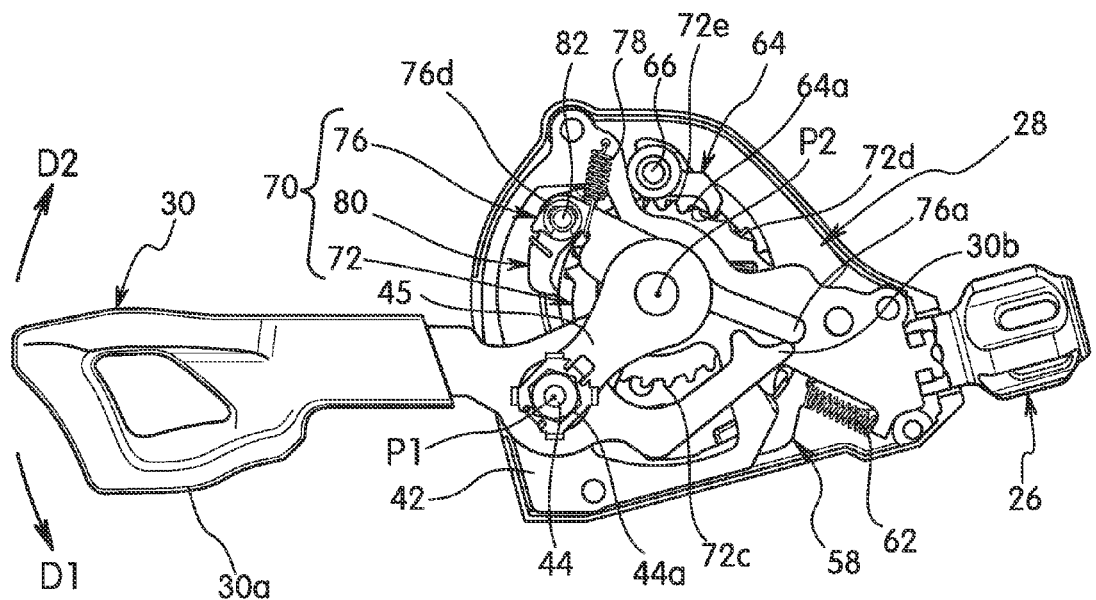
FIG. 14 is a bottom plan view of the right bicycle operating device illustrated in FIGS. 1 to 5, but with selected parts removed to show the mounting arrangement of the first operating member.
Figure 15:
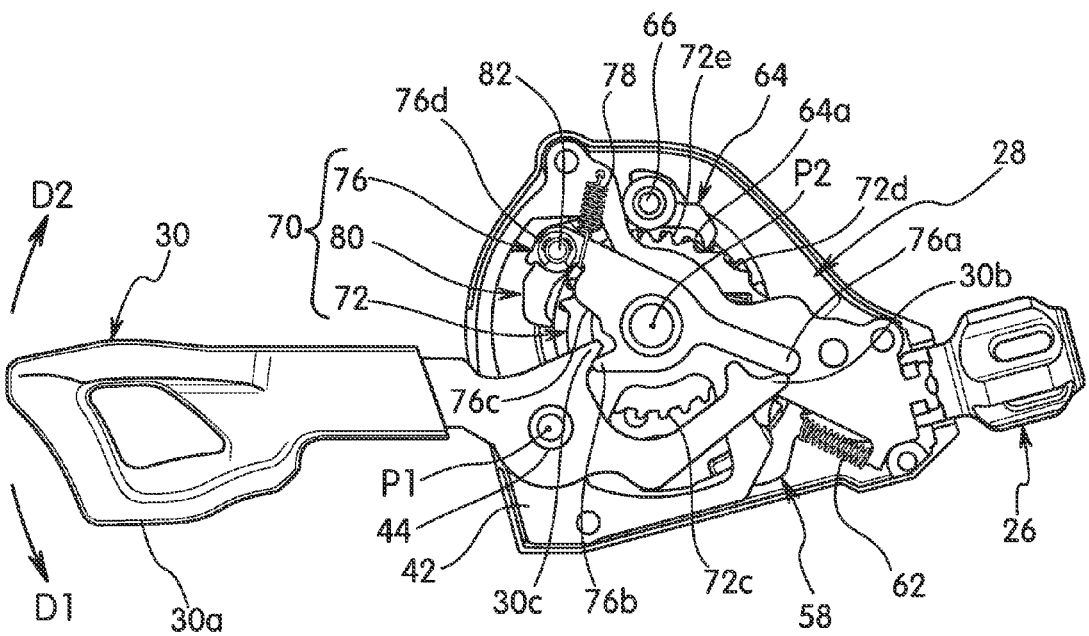
FIG. 15 is a bottom plan view of the right bicycle operating device illustrated in FIGS. 1 to 5, but with selected parts removed to show the relationship between the control member and the first operating member in their rest positions.

In the illustrated embodiment, the positioning member 56 is a flat plate that is formed from a rigid material such as a metallic material. As seen in FIGS. 9 and 11 the positioning member 56 has a non-circular opening 56a for receiving the projections 50b of the wire takeup member 50. The projections 50b mates with the non-circular opening 56a to prevent relative rotation. The positioning member 56 has a peripheral edge that has a plurality of positioning abutments or teeth 56b and a plurality of winding abutments or teeth 56c. The positioning member 56 is rotatably mounted on the main pivot shaft 46 to rotate with the wire takeup member 50 due to the mating configuration mentioned above. Since the positioning member 56 is non-rotatably mounted on the wire takeup member 50, the biasing element 54 also biases the positioning member 56 in the first moving direction R1.

The positioning pawl 58 is pivotally mounted to the housing 22 by a pivot pin 60 that is fixed between the top and bottom support plates 41 and 42. A biasing element 62 is provided for biasing the positioning pawl 58 towards in engagement with the positioning member 56. In the illustrated embodiment, for example, the biasing element 62 is a compression spring that pushes the positioning pawl 58 towards the peripheral edge of the positioning member 56.

The positioning abutments 56b cooperate with the positioning pawl 58 to define the plurality of holding positions of the wire takeup member 50. In particular, the positioning pawl 58 is provided with a pair of teeth 58a and 58b that selectively engage the positioning abutments 56b to hold the positioning member 56 from rotating under the urging force of the biasing element 54.

Preferably, the positioning abutments 56b have their outermost points being located at different radial distances from the second pivot axis P2. In the illustrated embodiment, the positioning abutments 56b are sequentially spaced farther from the second pivot axis P2 for each subsequent one of the positioning abutments 56b in the second moving direction R2 with respect to the prior adjacent one of the positioning abutments 56b. Thus, the positioning abutments 56b form steps that move away from the second pivot axis P2 as the steps move around the second pivot axis P2 in the second moving direction R2.

In the illustrated embodiment, the shift unit 28 also includes a winding pawl 64 that is pivotally mounted to the second operating member 32 by a pivot pin 66. A biasing element 68 is provided on the pivot pin 66 for biasing the winding pawl 64 towards in engagement with the positioning member 56. In the illustrated embodiment, for example, the biasing element 68 is a torsion spring that urges the winding pawl 64 towards the peripheral edge of the positioning member 56. In particular, with the first and second operating members 32 in the rest positions, the winding pawl 64 contacts the peripheral edge of the positioning member 56 due to the urging force of the biasing element 68. A tooth 64a of the winding pawl 64 engages one of the winding abutments 56c of the positioning member 56 to rotate the positioning member 56 and the wire takeup member 50 together in the second moving direction R2 as the second operating member 32 is pivoted from the rest position in the third operating direction D3. This rotation of the wire takeup member 50 together in the second moving direction R2 pulls the inner wire 16a into the housing 22 of the fixed member 20.

In the illustrated embodiment, the shift unit 28 also includes a moving arrangement 70 that is operatively coupled to the position maintaining arrangement 52 to selectively move the wire takeup member 50 in the first moving direction R1 such that the wire takeup member 50 moves from a current holding position to another one of the plurality of holding positions. In particular, the moving arrangement 70 is operated by the first operating member 30, which is provided with a first contact portion 30b and a second contact portion 30c for operating the moving arrangement 70 as discussed below.

The first operating member 30 can be moved from the rest position in the first operating direction D1 to operate the moving arrangement 70 such that the position maintaining arrangement 52 releases the wire takeup member 50 for movement in the first moving direction R1. Also, the first operating member 30 can be moved from the rest position in the second operating direction D2 to operate the moving arrangement 70 such that the position maintaining arrangement 52 releases the wire takeup member 50 for movement in the first moving direction R1. In the illustrated embodiment, the wire takeup member 50 can be only moved by a single holding position as the first operating member 30 is moved from the rest position to a first end position in the first operating direction D1 with a single progressive stroke. On the other hand, the wire takeup member 50 can be only moved either by a single holding position or by two holding positions as the first operating member 30 is moved from the rest position to a second end position in the second operating direction D2 with a single progressive stroke.

Referring mainly to FIGS. 10 to 16, the moving arrangement 70 will now be explained in more detail. In the illustrated embodiment, the moving arrangement 70 includes a release member or ratchet 72 that is operated by the first operating member 30 to disengage the teeth 58a and 58b of the positioning pawl 58 from the positioning abutments 56b and to disengage the tooth 64a of the winding pawl 64 from the winding abutments 56c of the positioning member 56.

Basically, the position maintaining arrangement 52 and the moving arrangement 70 are arranged such that the wire takeup member 50 is moved in the first moving direction R1 by only one of the plurality of holding positions as the first operating member 30 is moved from the rest position to a first end position in the first operating direction D1. On the other hand, the position maintaining arrangement 52 and the moving arrangement 70 are arranged such that the wire takeup member 50 is moved in the first moving direction R1 by at least two of the plurality of holding positions as the first operating member 30 is moved from the rest position to the second end position. In particular, when the first operating member 30 is moved in the second operating direction D2 from the rest position to an intermediate position between the rest position and the second end position, the wire takeup member 50 is moved in the first moving direction R1 by only one of the plurality of holding positions. However, if the rider continues to move the first operating member 30 in the second operating direction D2 from the intermediate position to the second end position without returning to the rest position, then the wire takeup member 50 will be moved in the first moving direction R1 by at least one more of the plurality of holding positions. In this way, the wire takeup member 50 is moved a first predetermined number of the plurality of holding positions in the first moving direction R1 as the first operating member 30 moves from the rest position to the first end position, and the wire takeup member 50 is moved a second predetermined number of the plurality of holding positions in the first moving direction R1 as the first operating member 30 moves from the rest position to the second end position. The first predetermined number is different from the second predetermined number. In the illustrated embodiment, the first predetermined number is less than the second predetermined number such that the user operating portion of the first operating member 30 can be made larger without hitting the handlebar 10.

In the illustrated embodiment, as seen in FIG. 11, the release member 72 is a flat plate that is formed from a rigid material such as a metallic material. The release member 72 has a center opening 72a with two cutouts 72b for receiving two of the projections 50b of the wire takeup member 50. The circumferential dimension of the cutouts 72b is larger than the circumferential dimension of the projections 50b that mates with the cutouts 72b such that a limited amount of relative rotation occurs between the release member 72 and the positioning member 56, which is fixed to the wire takeup member 50. Preferably a compression spring 74 is provided in corresponding cutouts of the positioning member 56 and the release member 72 to takeup the rotational play between the positioning member 56 and the release member 72.

Illustrated embodiment, the peripheral edge of the release member 72 has a plurality of first abutments 72c, a plurality of second abutments 72d and a plurality of third abutments 72e. Basically, the first abutments 72c are used for rotating the release member 72 in the first moving direction R1 on the second pivot axis P2. The second abutments 72d are used for disengaging the positioning pawl 58 from the positioning abutments 56b of the positioning member 56. The third abutments 72e are used for disengaging the winding pawl 64 from the winding abutments 56c of the positioning member 56.

Preferably, the second abutments 72d have their outermost points being located at different radial distances from the second pivot axis P2. In the illustrated embodiment, the second abutments 72d are sequentially spaced farther from the second pivot axis P2 for each subsequent one of the second abutments 72d in the second moving direction R2 with respect to the prior adjacent one of the second abutments 72d. Thus, the second abutments 72d form steps that move away from the second pivot axis P2 as the steps move around the second pivot axis P2 in the second moving direction R2. During operation of the first operating member 30, the release member 72 is rotated in the second moving direction R2. Due to the limited amount of rotational play between the release member 72 and the positioning member 56, the release member 72 will initially rotate in the first moving direction R1 relative to the positioning member 56, which initially remains stationary. This initial movement of the release member 72 causes one of the second abutments 72d to contact the positioning pawl 58 and pivot the positioning pawl 58 out of engagement from the positioning abutments 56b of the positioning member 56.

In the illustrated embodiment, the third abutments 72e are arranged to substantially overlap with the winding abutments 56c of the positioning member 56 while the first and second operating members 30 and 32 are in their rest position. However, due to the limited amount of rotational play between the release member 72 and the positioning member 56, as the release member 72 is initially rotated in the first moving direction R1 by the first operating member 30, the third abutments 72e will move in between the winding abutments 56c of the positioning member 56, which initially remains stationary. As a result, one of the third abutments 72e contacts the winding pawl 64 and pivots the winding pawl 64 out of engagement from the winding abutments 56c of the positioning member 56.

As seen in FIGS. 12 to 16, in the illustrated embodiment, the moving arrangement 70 further includes a control member 76 that is operatively disposed between the first operating member 30 and the release member 72. In particular, the control member 76 is rotatably mounted on the main pivot shaft 46 below the bottom support plate 42. Thus, the control member 76 is rotatably mounted on the second pivot axis P2 that is offset from the first pivot axis P1 of the first operating member 30. Basically, the control member 76 has a first contact part 76a, a second contact part 76b, a stop part 76c and a pawl mounting part 76d. The first contact portion 30b of first operating member 30 contacts the first contact part 76a of the control member 76 while the first operating member 30 is in the rest position. Also the second contact portion 30c of first operating member 30 contacts the second contact part 76b of the control member 76 while the first operating member 30 is in the rest position. In this way, the first operating member 30 is held in the rest position by the control member 76.

Basically, the first and second contact portions 30b and 30c contact the first and second contact parts 76a and 76b of the control member 76 at spaced apart locations with respect to the second pivot axis P2 so that the control member 76 rotates in a same rotational direction (i.e., the first moving direction R1) about the second pivot axis P2 as the first operating member 30 pivots from the rest position to the first and second end positions. In particular, when the first operating member 30 is pivoted in the first operating direction D1, the first operating member 30 rotates the control member 76 in the first moving direction R1 by the first operating member 30 pushing against the first contact part 76a. During movement of the first operating member 30 in the first operating direction D1, the first operating member 30 moves away from the second contact part 76b, and then the second contact portion 30c of the first operating member 30 contacts the stop part 76c. The stop part 76c establishes the first end position of the first operating member 30 by the stop part 76c contacting the first operating member 30 as the first operating member 30 pivots from the rest position to the first end position. The housing 22 establishes the second end position of the first operating member 30 by the first operating member 30 contacting the housing 22 as the first operating member 30 pivots from the rest position to the second end position.

A biasing element 78 is provided between the bottom support plate 42 and the control member 76 to bias the control member 76 in the second moving direction R2 about the second pivot axis P2. In the illustrated embodiment, for example, the biasing element 78 is a tension spring that has one end hooked on the bottom support plate 42 and the other end hooked on the control member 76 to urge the control member 76 in the second moving direction R2. Since the first operating member 30 contacts both of the first and second contact parts 76a and 76b of the control member 76 while the first operating member 30 is in the rest position, the first operating member 30 is also held in its rest position. Thus, the biasing element 78 also functions as a return spring for returning the first operating member 30 from an operated position back to the rest position.

The moving arrangement 70 further includes a release pawl 80 that is mounted on the pawl mounting part 76d of the control member 76 by a pivot pin 82. Basically, the release pawl 80 selectively engages one of the first abutments 72c to rotate the release member 72 as the first operating member 30 pivots from the rest position to the first and second end positions. As a result of the rotation of the release member 72, one of the second abutments 72d moves the positioning pawl 58 out of engagement from one of the positioning abutments 56b of the positioning member 56, and one of the third abutments 72e moves the winding pawl 64 out of engagement from one of the winding abutments 56c of the positioning member 56 as the first operating member 30 pivots from the rest position to the first and second end positions. Thus, the release pawl 80 releases the positioning member 56 of the position maintaining arrangement 52 for movement as the first operating member 30 pivots from the rest position to the first and second end positions. However, after the first operating member 30 returns to the rest position, the positioning pawl 58 moves back into engagement with one of the positioning abutments 56b of the positioning member 56, and the winding pawl 64 moves back into engagement with one of the winding abutments 56c of the positioning member 56 to hold the wire takeup member 50 in a new one of the plurality of holding positions.

A biasing element 84 is provided on the pivot pin 82 to bias the release pawl 80 towards engagement with the release member 72. In the illustrated embodiment, for example, the biasing element 84 is a torsion spring that has one end hooked on the control member 76 and the other end hooked on the release pawl 80 to urge the release pawl 80 towards engagement with the release member 72. However, with the first operating member 30 in the rest position, the release pawl 80 is held out of engagement from the release member 72. This situation occurs, because the biasing element 78 urges the control member 76 in the second moving direction R2, which results in the release pawl 80 being forced into contact with the bottom support plate 42 so that the release pawl 80 is pivoted away from the release member 72 against the biasing force of the biasing element 84. In particular, the release pawl 80 is partially located in an opening 42a in the bottom support plate 42 and partially located above the bottom support plate 42. In this way, the biasing element 78 urges the release pawl 80 against an internal edge of the bottom support plate 42, and thus, the release pawl 80 is pivoted away from the release member 72 against the biasing force of the biasing element 84. Also with the release pawl 80 being partially located above the bottom support plate 42, the tooth 80a of the release pawl 80 can engage the release member 72 which is also located above the bottom support plate 42.

Figure 17:
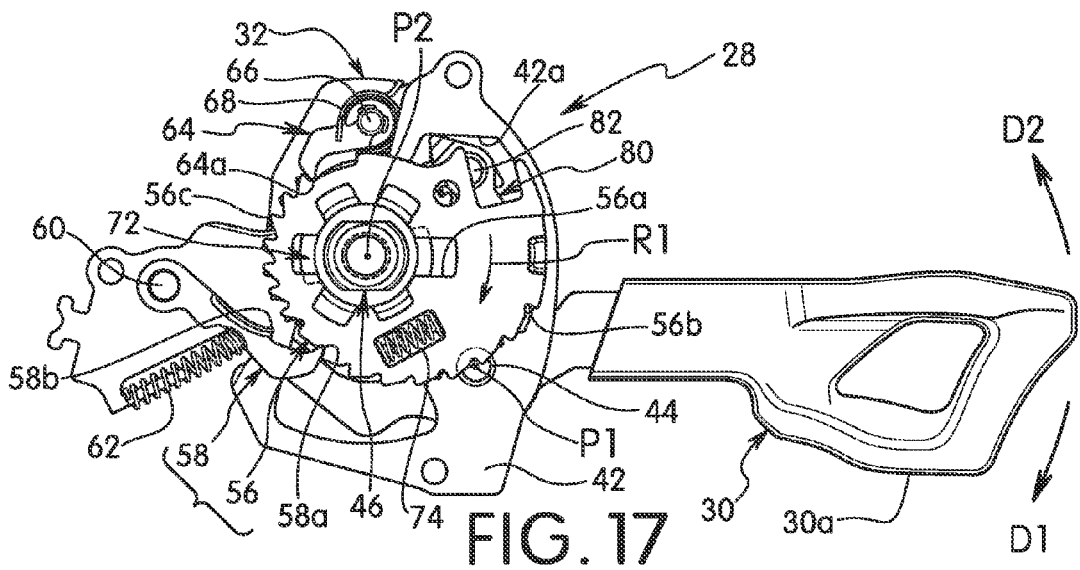
FIG. 17 is a top plan view of selected parts of the right bicycle operating device illustrated in FIGS. 1 to 5, but with selected parts removed to show the relationship between the position maintaining arrangement and the first operating member in their rest positions for the purpose of illustrating a shifting operation with the first operating member.
Figure 18:
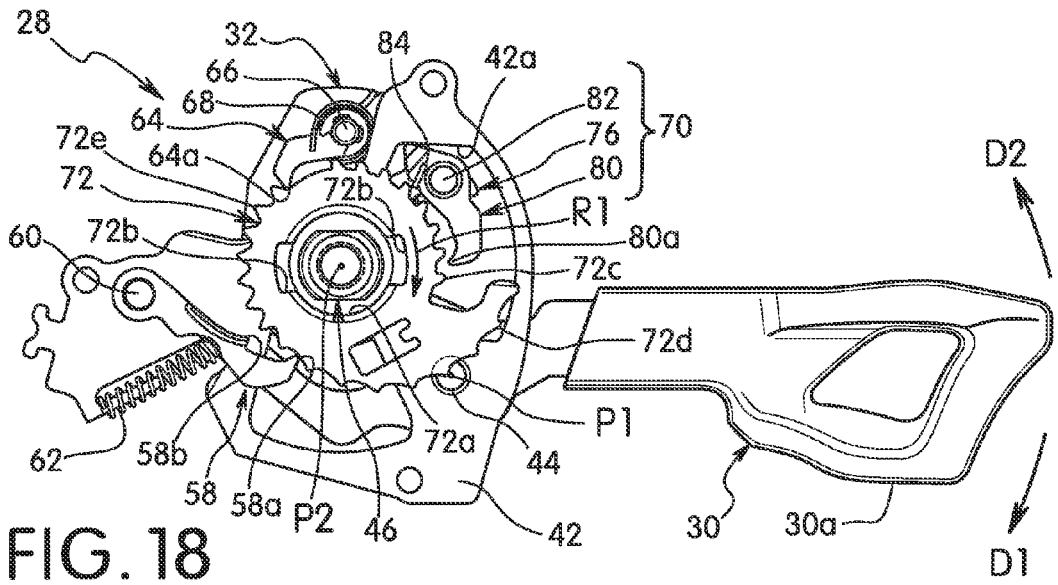
FIG. 18 is a top plan view of the selected parts illustrated in FIG. 17 in their rest positions, but with additional parts removed to more clearly to show the release member.
Figure 19:
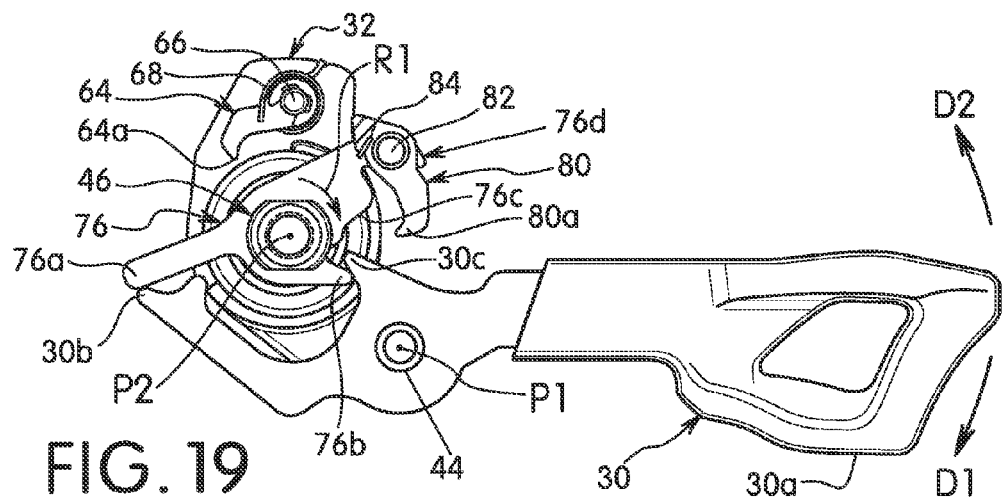
FIG. 19 is a top plan view of the selected parts illustrated in FIG. 18 in their rest positions, but with additional parts removed to more clearly show the control member and the first operating member.
Figure 20:
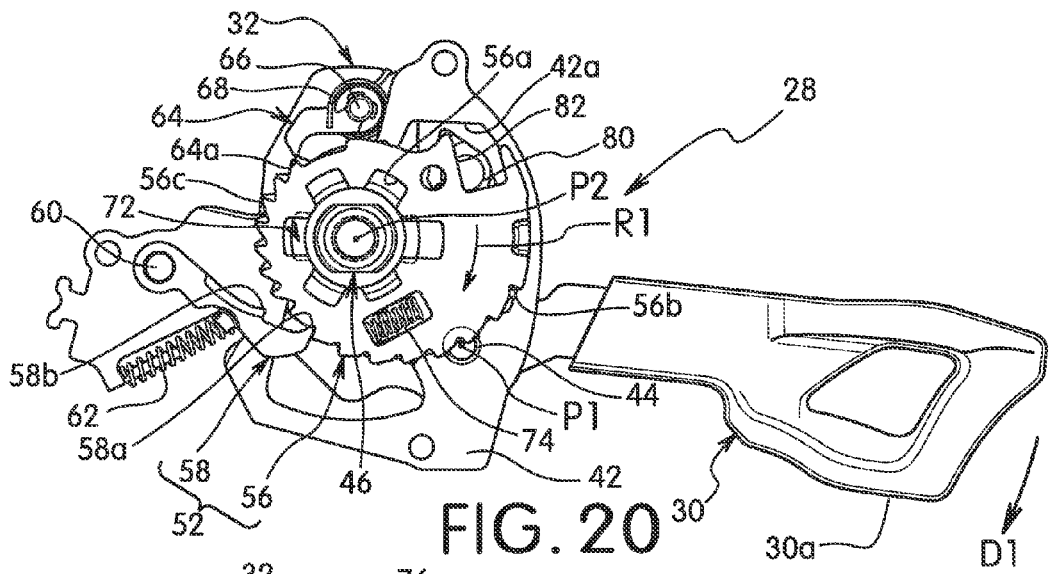
FIG. 20 is a top plan view of the selected parts illustrated in FIG. 17, but with the first operating member being moved in the first operating direction from the rest position, illustrated in FIGS. 17 to 19, to an intermediate operated position to release the positioning pawl and the winding pawl from the positioning plate during a shift operation.
Figure 21:
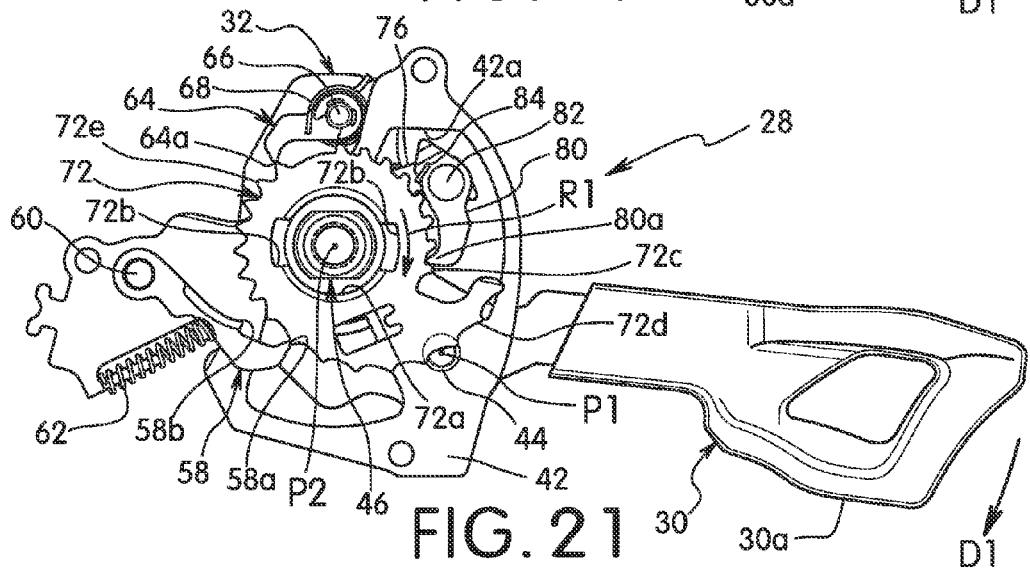
FIG. 21 is a top plan view of the selected parts illustrated in FIG. 20 in their rest positions, but with additional parts removed to more clearly to show the release member.
Figure 22:
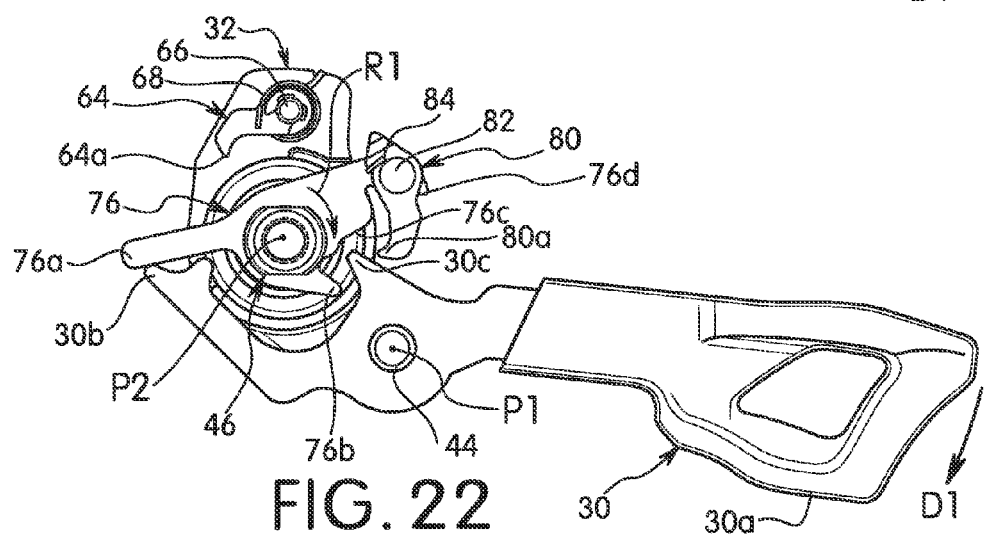
FIG. 22 is a top plan view of the selected parts illustrated in FIG. 21 in their rest positions, but with additional parts removed to more clearly show the control member and the first operating member.
Figures 23, 24, 25:
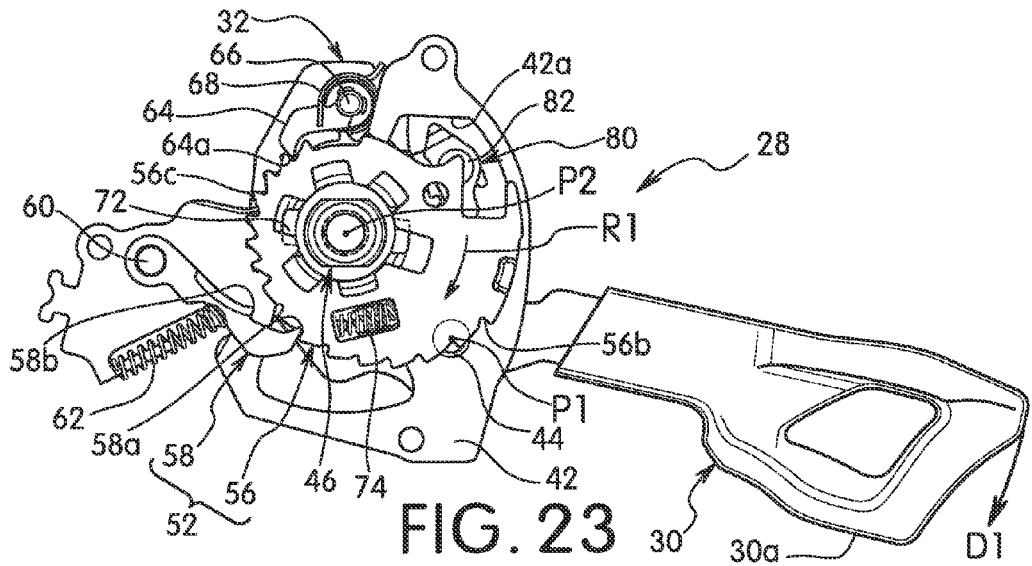
FIG. 23 is a top plan view of the selected parts illustrated in FIGS. 17 and 20, but with the first operating member being moved further in the first operating direction from the intermediate operated position, illustrated in FIGS. 20 to 22, to a fully operated position, that corresponds to a first end position, to perform a single stage shift operation.
FIG. 24 is a top plan view of the selected parts illustrated in FIG. 23 in their rest positions, but with additional parts removed to more clearly to show the release member.
FIG. 25 is a top plan view of the selected parts illustrated in FIG. 24 in their rest positions, but with additional parts removed to more clearly show the control member and the first operating member.
Figure 26:
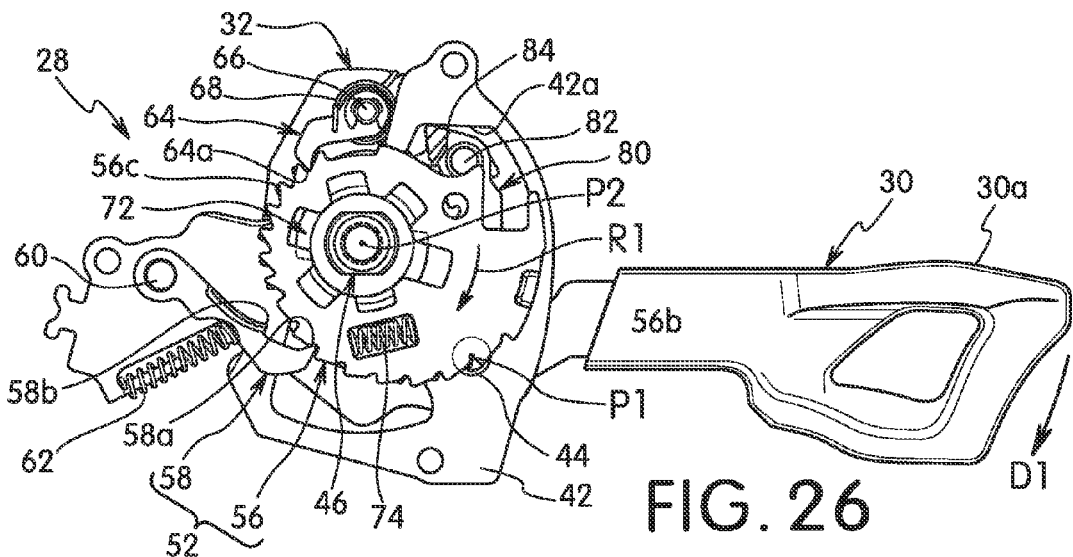
FIG. 26 is a top plan view of the selected parts illustrated in FIGS. 17, 20 and 23, but with the first operating member being moved in the second operating direction from the fully operated position, illustrated in FIGS. 17 to 19, back to the rest position.
Figure 27:
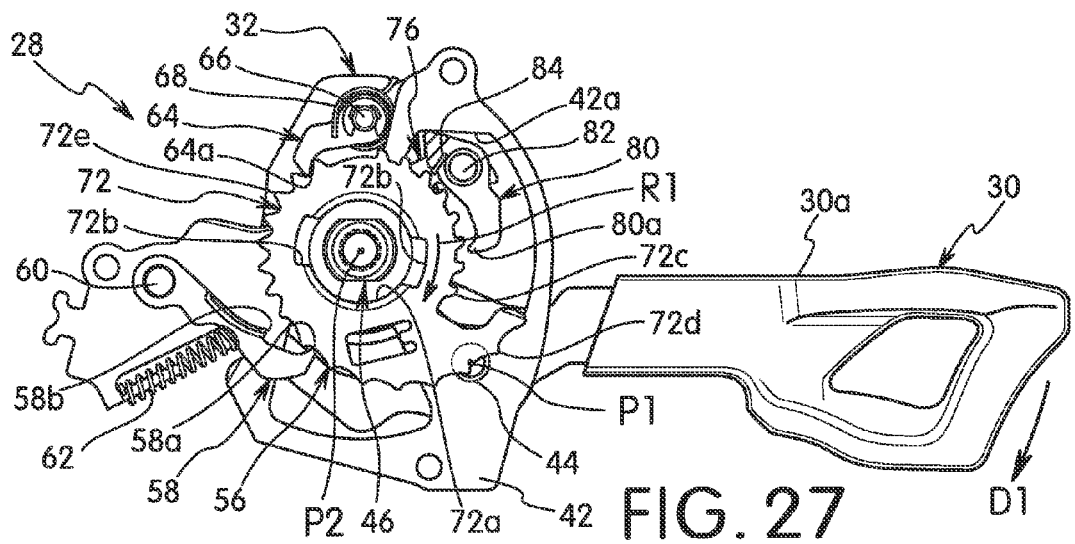
FIG. 27 is a top plan view of the selected parts illustrated in FIG. 26 in their rest positions, but with additional parts removed to more clearly to show the release member.
Figure 28:
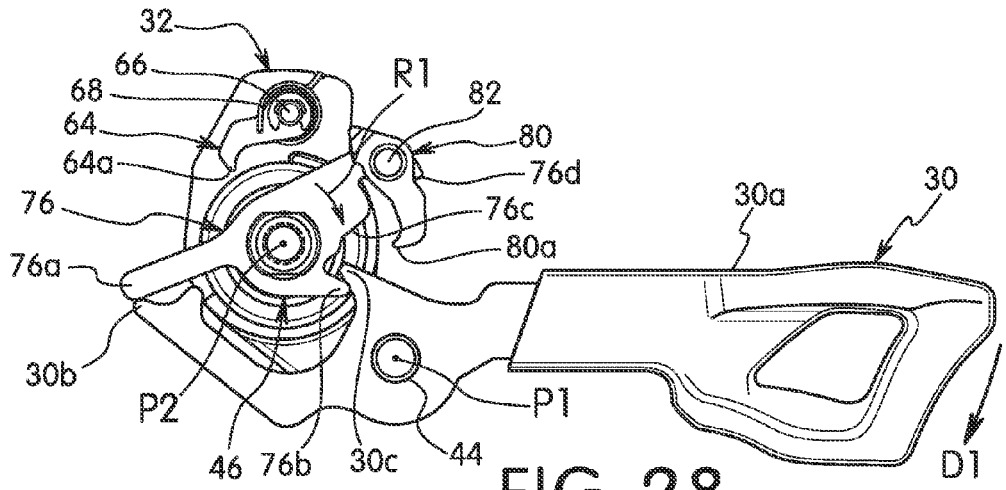
FIG. 28 is a top plan view of the selected parts illustrated in FIG. 27 in their rest positions, but with additional parts removed to more clearly show the control member and the first operating member.

Referring to FIGS. 17 to 28, a single stage shifting operating is illustrated in which the first operating member 30 is pivoted in the first operating direction D1. Basically, FIGS. 17 to 19 show the parts of the shift unit 28 and the first operating member 30 in their rest positions. FIGS. 20 to 22 show the first operating member 30 being initially pivoted in the first operating direction D1 such that the release pawl 80 rotates the release member 72. As a result of the rotation of the release member 72, one of the second abutments 72d moves the positioning pawl 58 out of engagement from one of the positioning abutments 56b of the positioning member 56, and one of the third abutments 72d moves the winding pawl 64 out of engagement from one of the winding abutments 56c of the positioning member 56. FIGS. 23 to 25 show the first operating member 30 being fully pivoted in the first operating direction D1 to the first end position, which is established by the second contact portion 30c of the first operating member 30 contacts the stop part 76c. FIGS. 26 to 28 show the first operating member 30 being returned to the rest position from the first end position. When the first operating member 30 returns to the rest position, the positioning pawl 58 moves back into engagement with one of the positioning abutments 56b of the positioning member 56, and the winding pawl 64 moves back into engagement with one of the winding abutments 56c of the positioning member 56 to hold the wire takeup member 50 in a new one of the plurality of holding positions.

Figure 29:
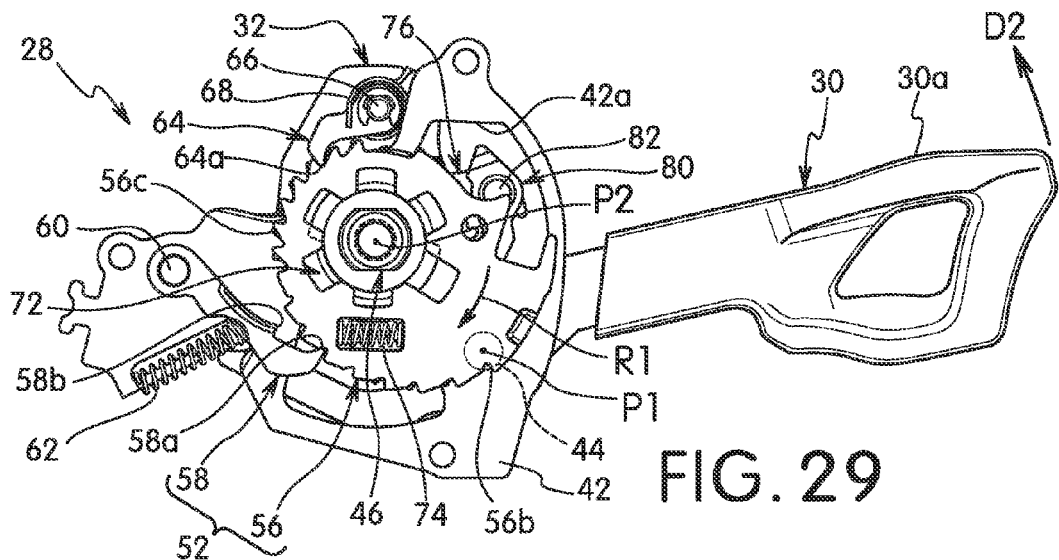
FIG. 29 is a top plan view of the selected parts illustrated in FIG. 26, but with the first operating member being moved in the second operating direction from the rest position, illustrated in FIGS. 26 to 28, to an intermediate operated position to perform a single stage shift operation.
Figure 30:
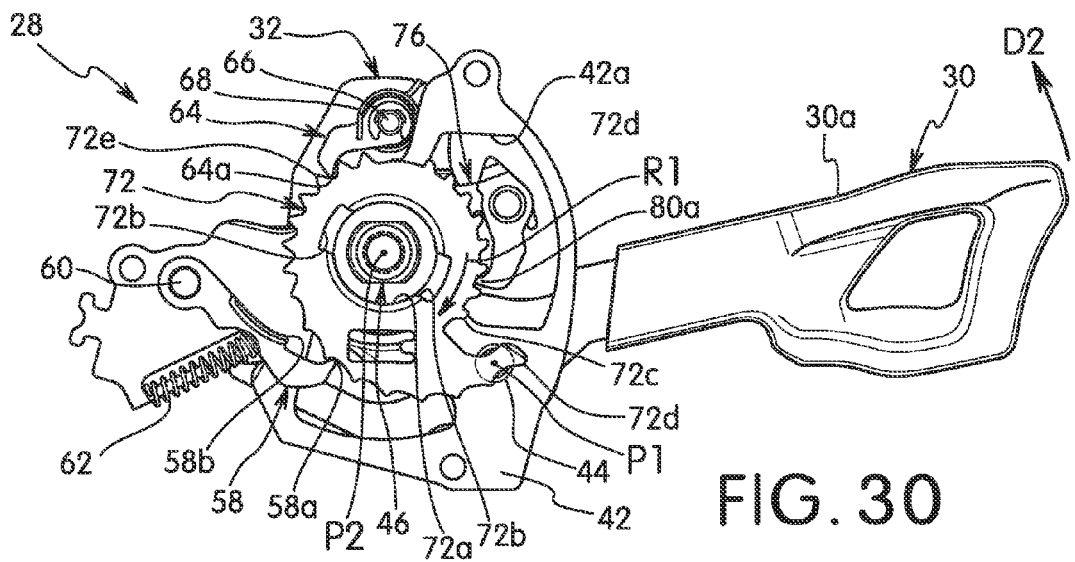
FIG. 30 is a top plan view of the selected parts illustrated in FIG. 29 in their rest positions, but with additional parts removed to more clearly to show the release member.
Figure 31:
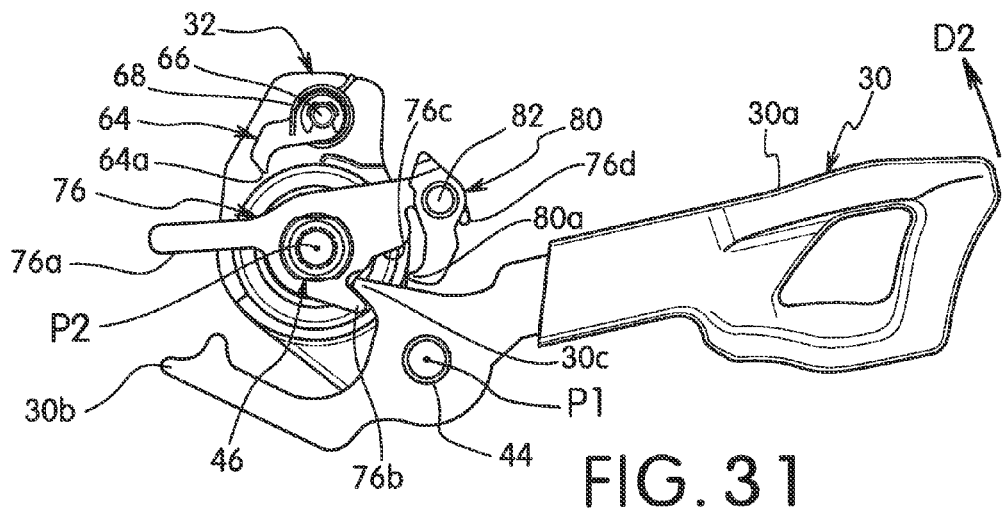
FIG. 31 is a top plan view of the selected parts illustrated in FIG. 30 in their rest positions, but with additional parts removed to more clearly show the control member and the first operating member.
Figure 32:
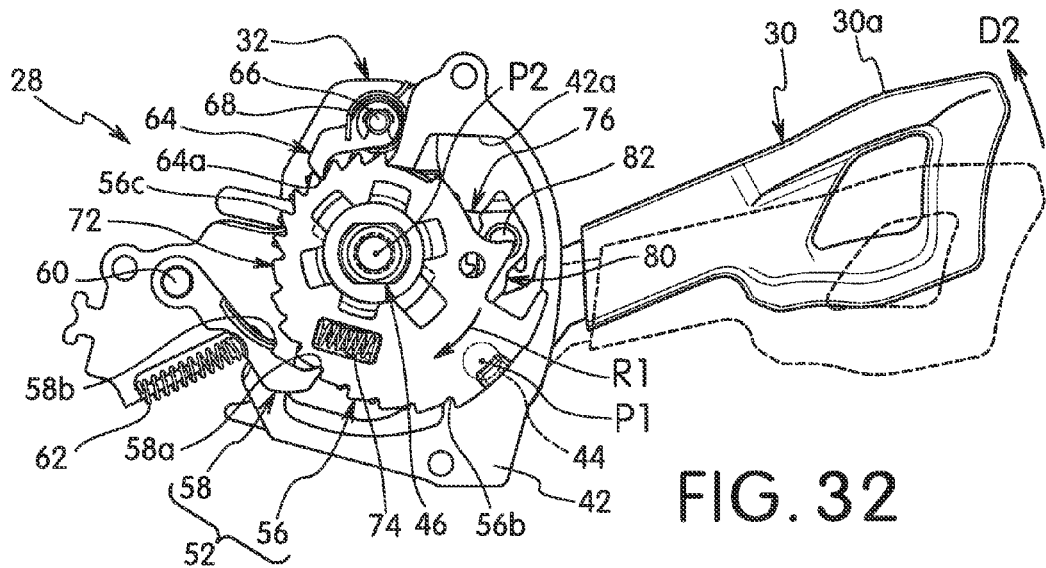
FIG. 32 is a top plan view of the selected parts illustrated in FIGS. 26 and 29, but with the first operating member being moved further in the second operating direction from the intermediate operated position, illustrated in FIGS. 29 to 31, to a fully operated position, that corresponds to a second end position, to perform a two stage shift operation in a single progress shifting operation (stroke) from the rest position (FIG. 26)
Figure 33:
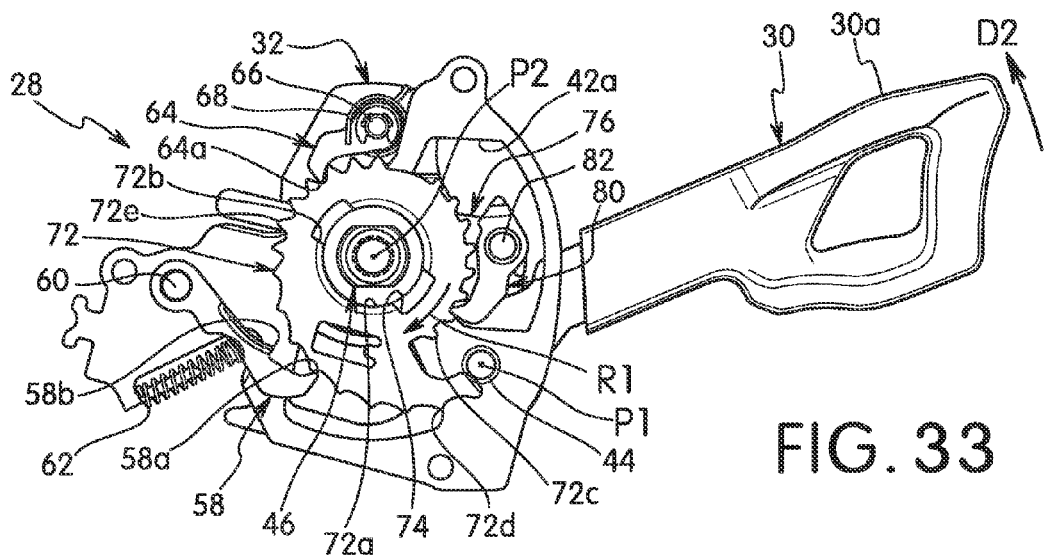
FIG. 33 is a top plan view of the selected parts illustrated in FIG. 32 in their rest positions, but with additional parts removed to more clearly to show the release member.
Figure 34:
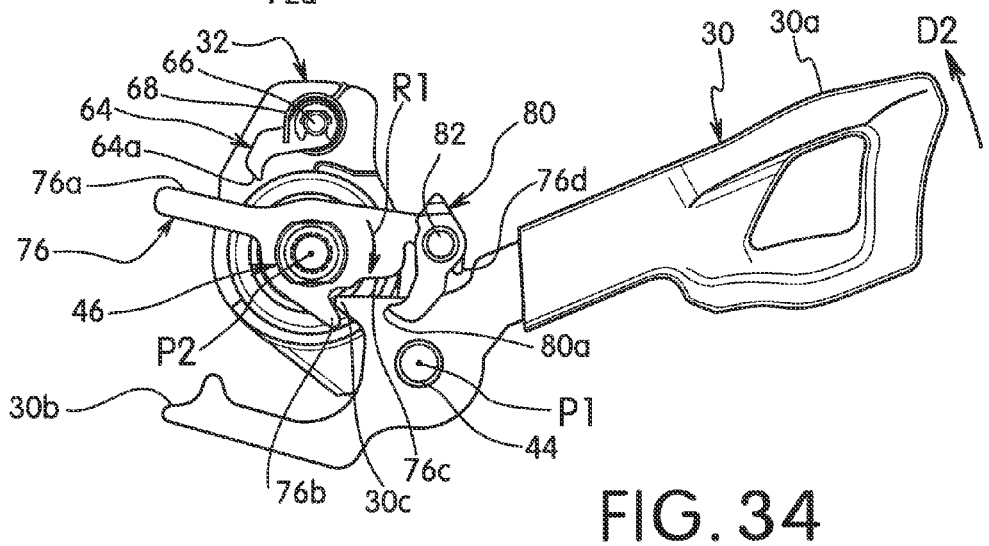
FIG. 34 is a top plan view of the selected parts illustrated in FIG. 33 in their rest positions, but with additional parts removed to more clearly show the control member and the first operating member.
Figure 35:
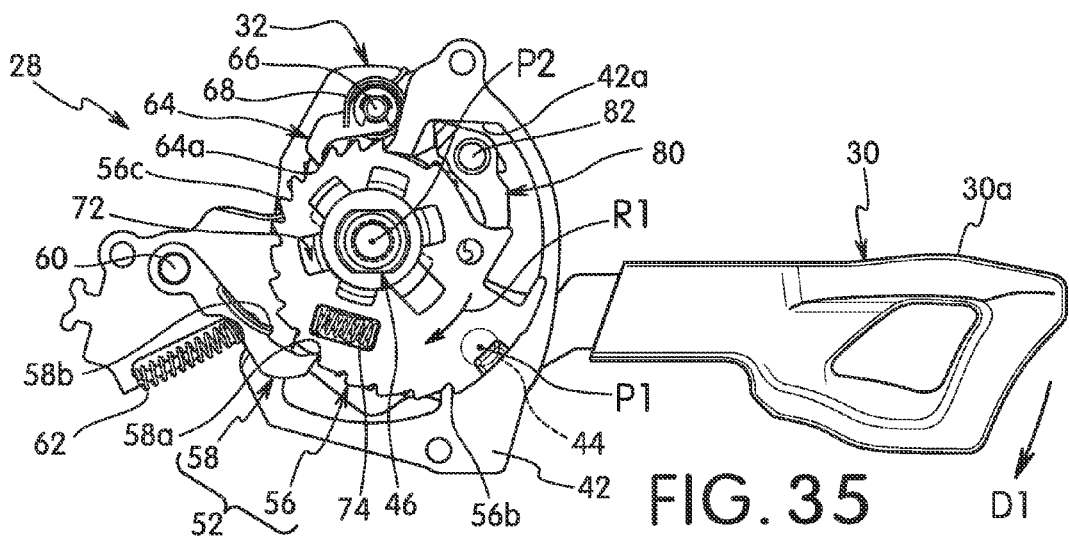
FIG. 35 is a top plan view of the selected parts illustrated in FIGS. 26, 29 and 32, but with the first operating member being moved in the first operating direction from the fully operated position, illustrated in FIGS. 32 to 34, back to the rest position.
Figure 36:
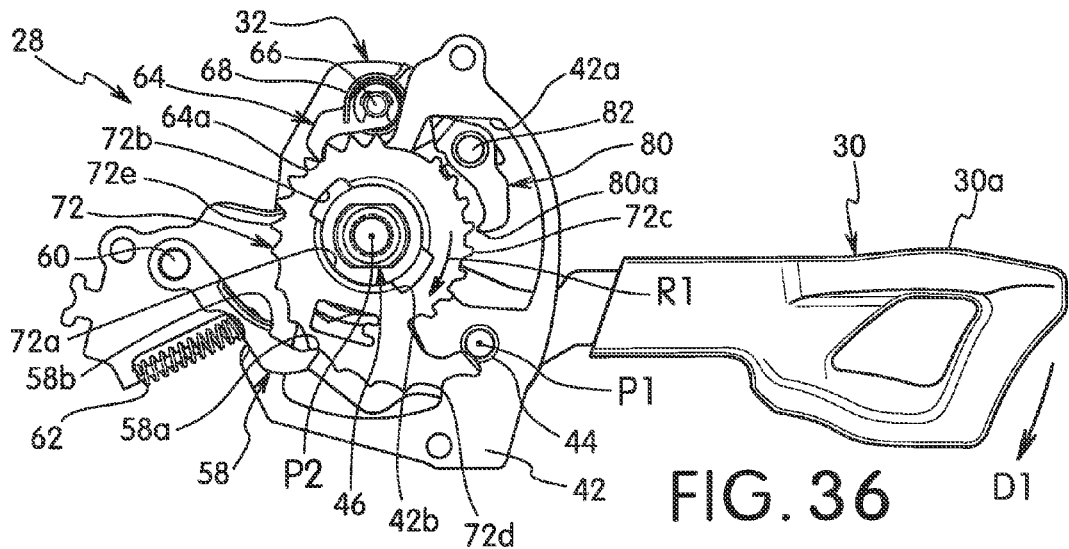
FIG. 36 is a top plan view of the selected parts illustrated in FIG. 35 in their rest positions, but with additional parts removed to more clearly to show the release member.
Figure 37:
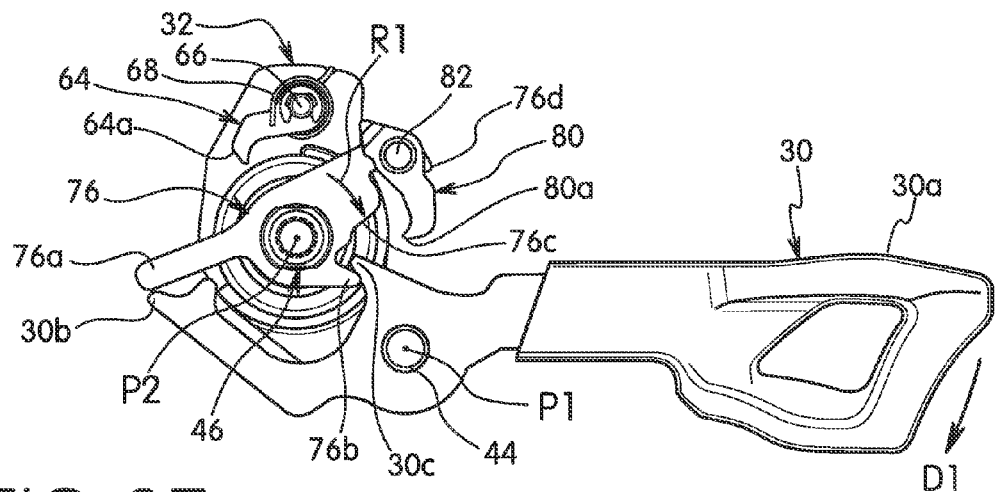
FIG. 37 is a top plan view of the selected parts illustrated in FIG. 36 in their rest positions, but with additional parts removed to more clearly show the control member and the first operating member.

Referring to FIGS. 29 to 37, a two stage shifting operation is illustrated in which the first operating member 30 is pivoted in the second operating direction D2. Here, FIGS. 29 to 31 illustrate the first operating member 30 being pivoted to an intermediate position between the rest position and the second end position to shift a first stage. FIGS. 32 to 34 illustrate the first operating member 30 being pivoted from the intermediate position (FIGS. 29 to 31) to the second end position to shift a second stage without first returning the rest position. FIGS. 35 to 37 illustrate the first operating member 30 being pivoted from the second end position (FIGS. 29 to 31) to the rest position.

Figure 38:
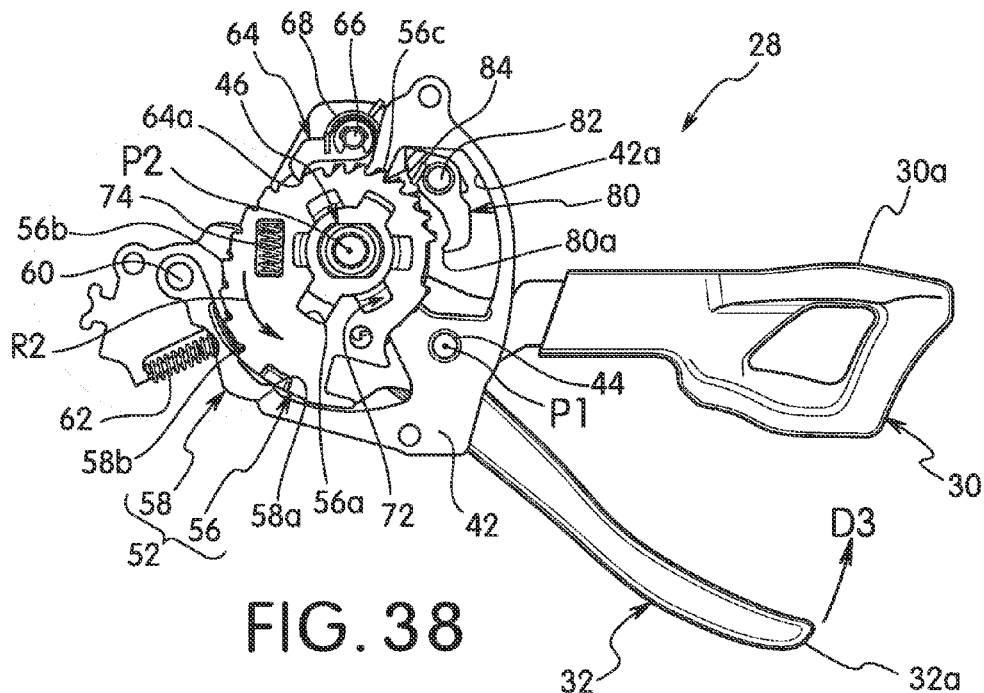
FIG. 38 is a top plan view of selected parts of the right bicycle operating device illustrated in FIGS. 1 to 5, but with selected parts removed to show the relationship between the position maintaining arrangement and the operating members in their rest positions for the purpose of illustrating a shifting operation with the second operating member.
Figure 39:
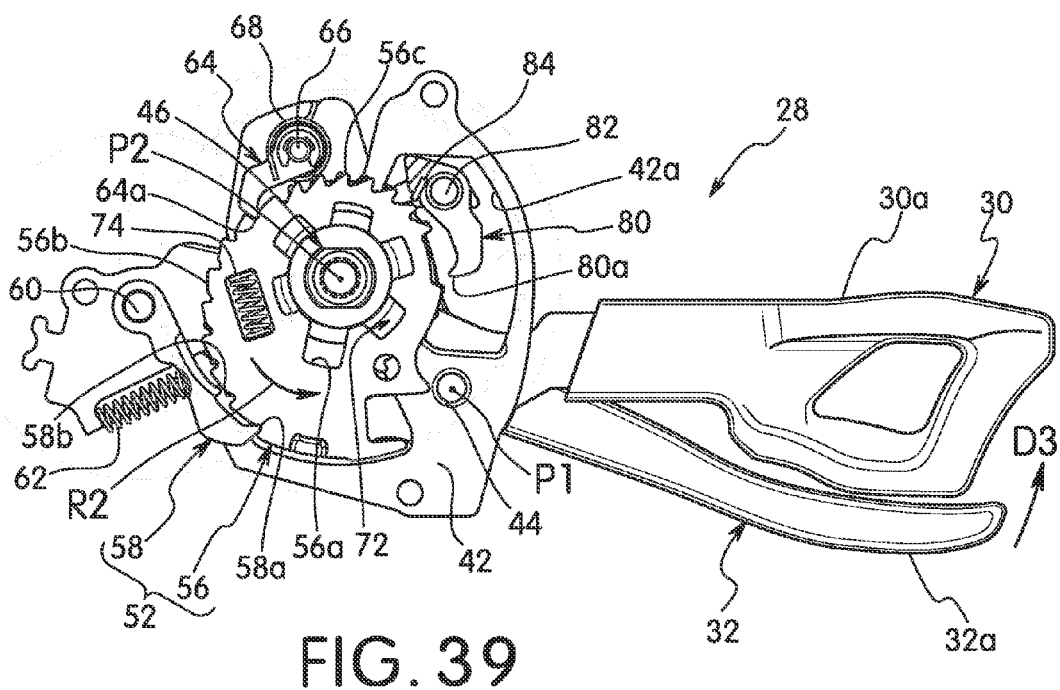
FIG. 39 is a top plan view of the selected parts illustrated in FIG. 38, but with the second operating member being moved from the rest position in FIG. 38 to an operated position to perform a single stage shift operation.
Figure 40:
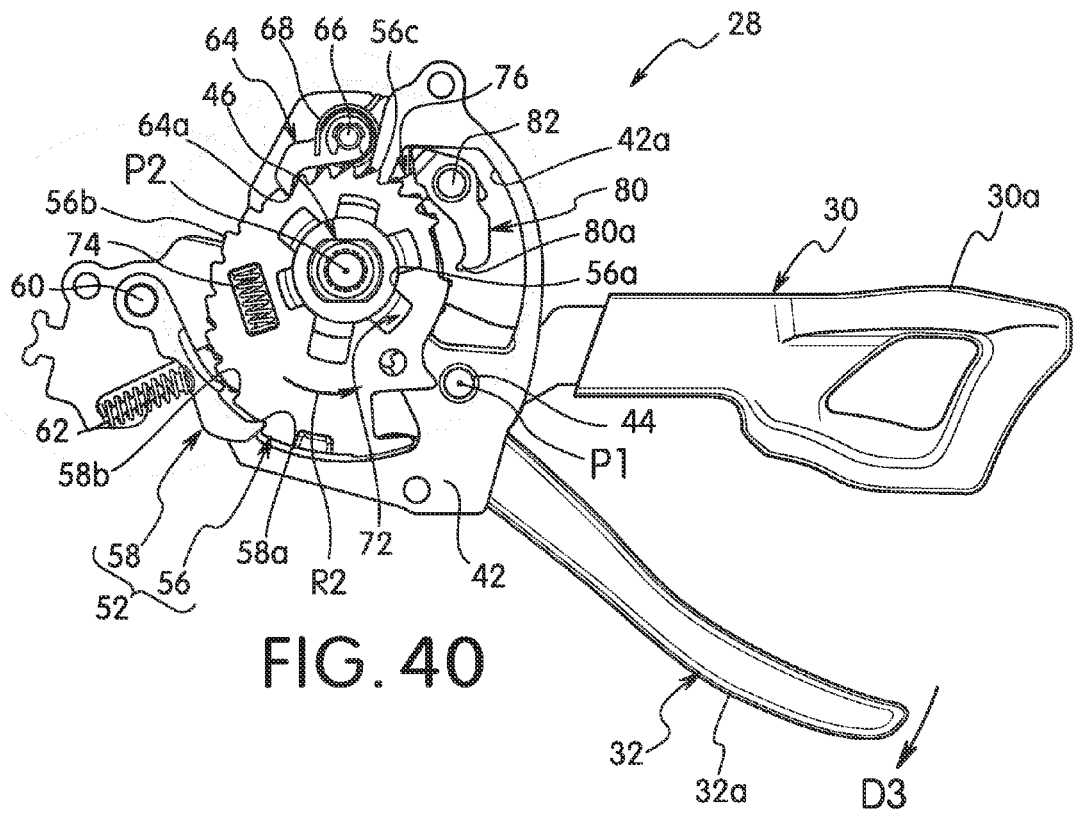
FIG. 40 is a top plan view of the selected parts illustrated in FIGS. 38 and 39, but with the second operating member being moved back to the rest position from the operated position of FIG. 39.
Figure 41:
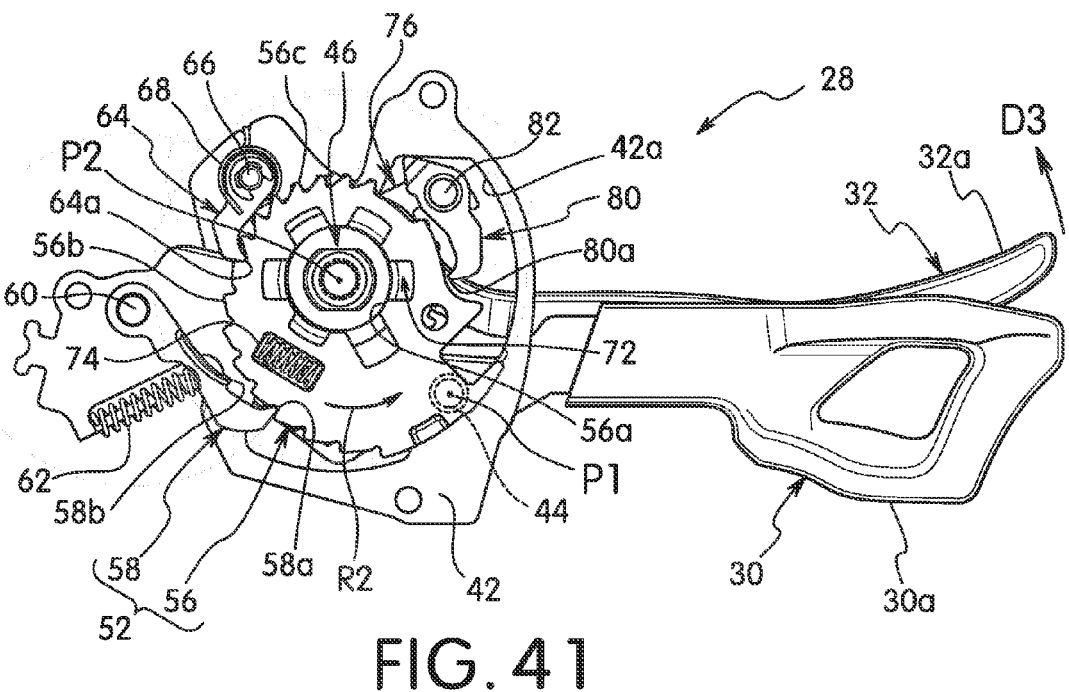
FIG. 41 is a top plan view of the selected parts illustrated in FIGS. 38 to 40, but with the second operating member being moved from the rest position in FIG. 40 to an operated position to perform a two stage shift operation.
Figure 42:
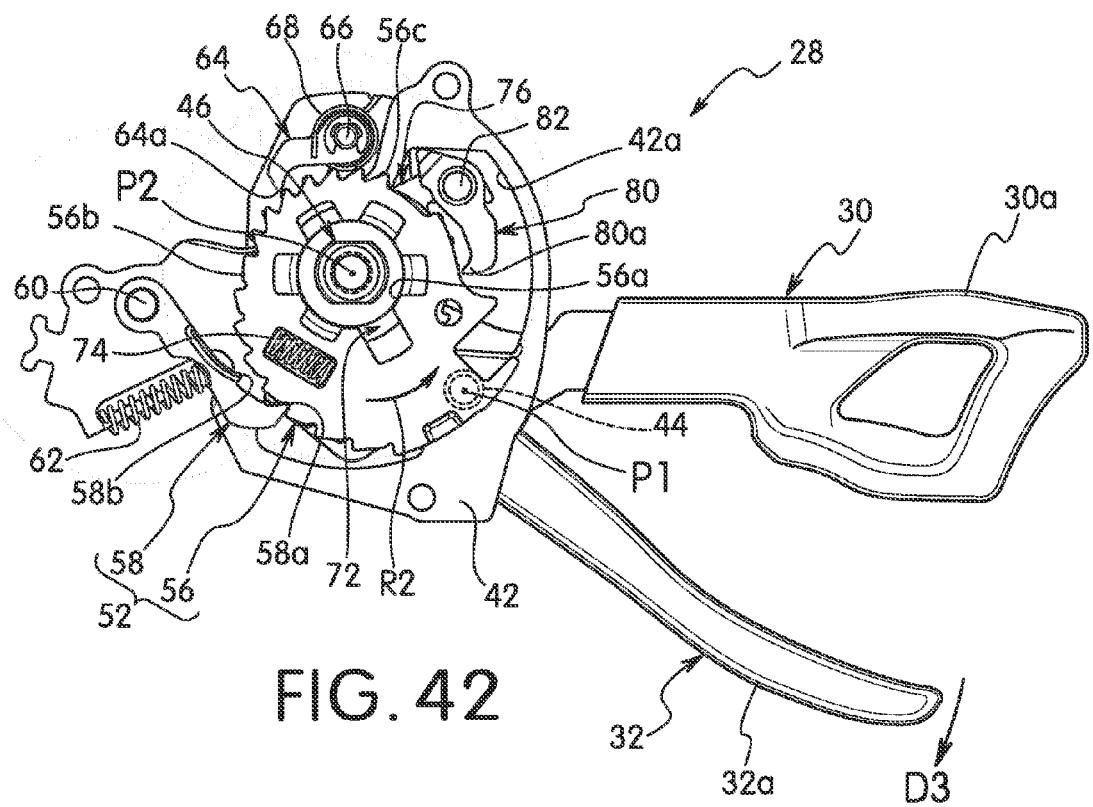
FIG. 42 is a top plan view of the selected parts illustrated in FIGS. 38 to 41, but with the second operating member in an intermediate position between the rest position of FIG. 40 and the operated position of FIG. 41 as the second operating member is being released.
Figure 43:
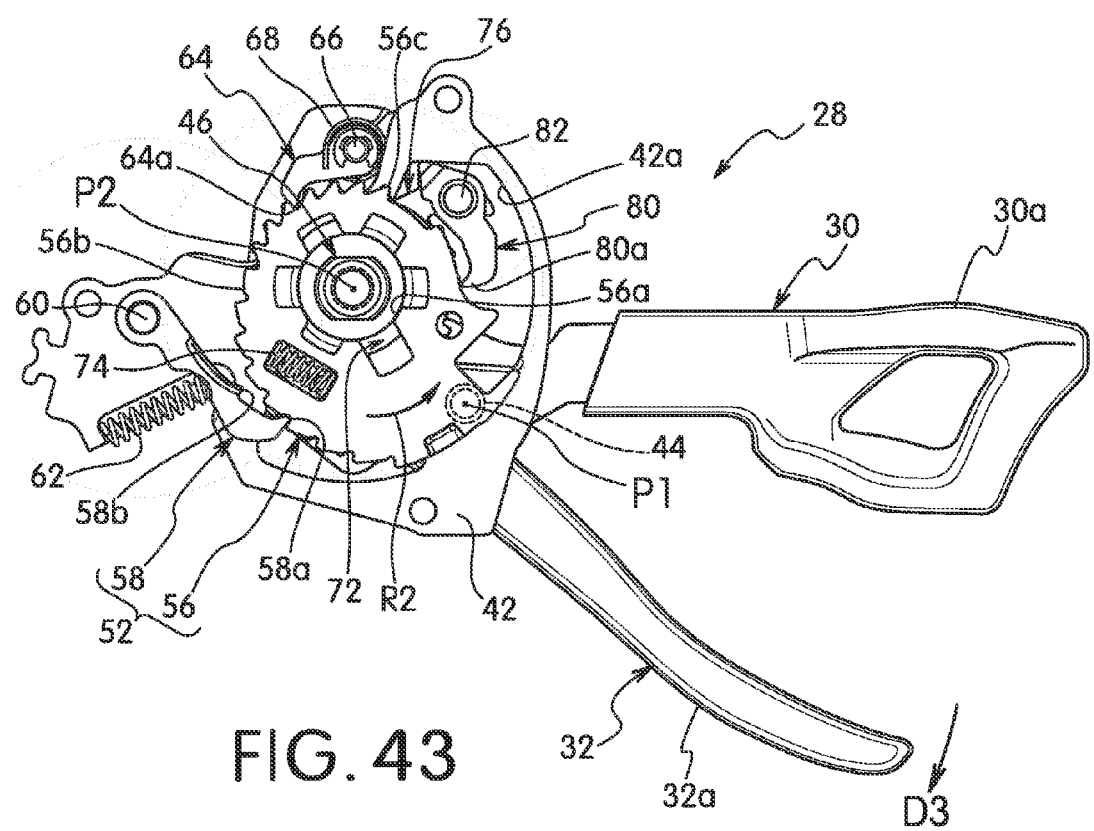
FIG. 43 is a top plan view of the selected parts illustrated in FIGS. 38 to 42, but with the second operating member completely moved back to the rest position from the operated position of FIG. 41.

Referring to FIGS. 38 to 39, a shifting operation with the second operating member 32 is illustrated in which the second operating member 32 is pivoted in the third operating direction D3. Here, the tooth 64a of the winding pawl 64 engages one of the winding abutments 56c of the positioning member 56 to rotate the positioning member 56 and the wire takeup member 50 together in the second moving direction R2 as the second operating member 32 is pivoted from the rest position in the third operating direction D3. FIG. 38 shows the rest position of the parts of the shift unit 28 and the second operating member 32 in their rest positions. FIG. 39 shows the second operating member 32 being pivoted in the third operating direction D3 such that the winding pawl 64 rotates the positioning member 56 and the positioning pawl 58 engages the next one of the positioning abutments 56b to perform a single shift stage. FIG. 40 shows the second operating member 32 being returned to the rest position from the single shift stage position of FIG. 39. When the second operating member 32 returns to the rest position, the winding pawl 64 will move back to its original position and engage a different one of the winding abutments 56c of the positioning member 56. FIG. 41 show the second operating member 32 being pivoted in the third operating direction D3 such that the winding pawl 64 rotates the positioning member 56 and the positioning pawl 58 engages the positioning abutments 56b corresponding to a two shift stage. FIG. 42 shows the second operating member 32 in the process of being returned to the rest position, while FIG. 43 shows the second operating member 32 after being returned to the rest position.

Figure 44:
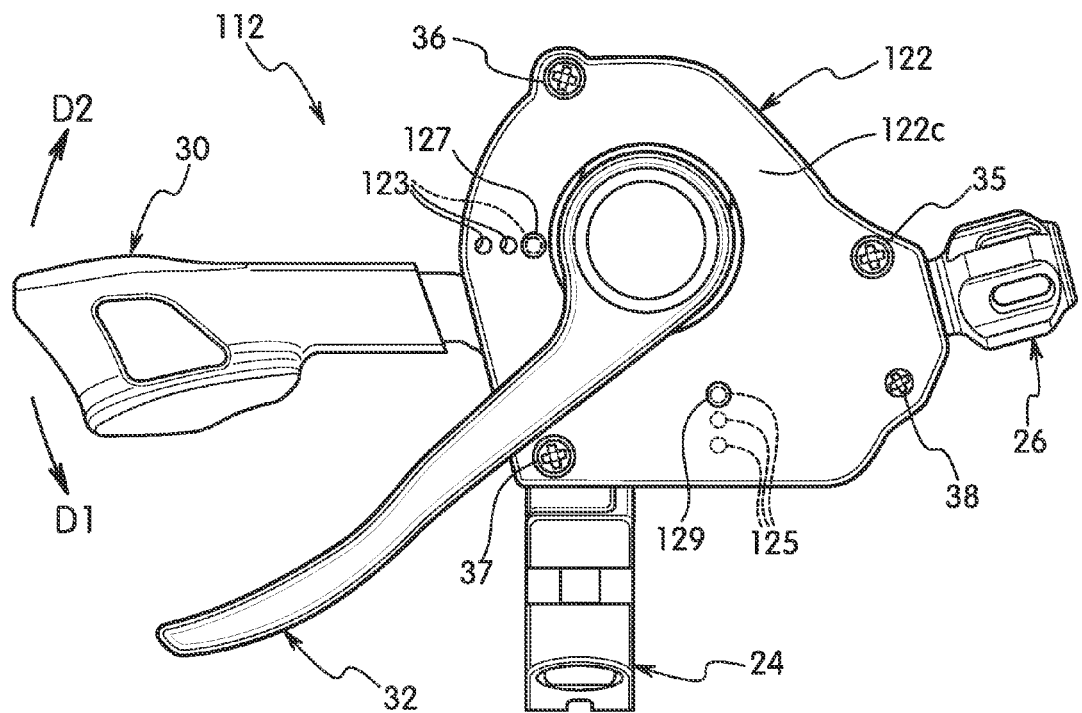
FIG. 44 is a bottom plan view of a right bicycle operating device in accordance with a second embodiment.
Figure 45:
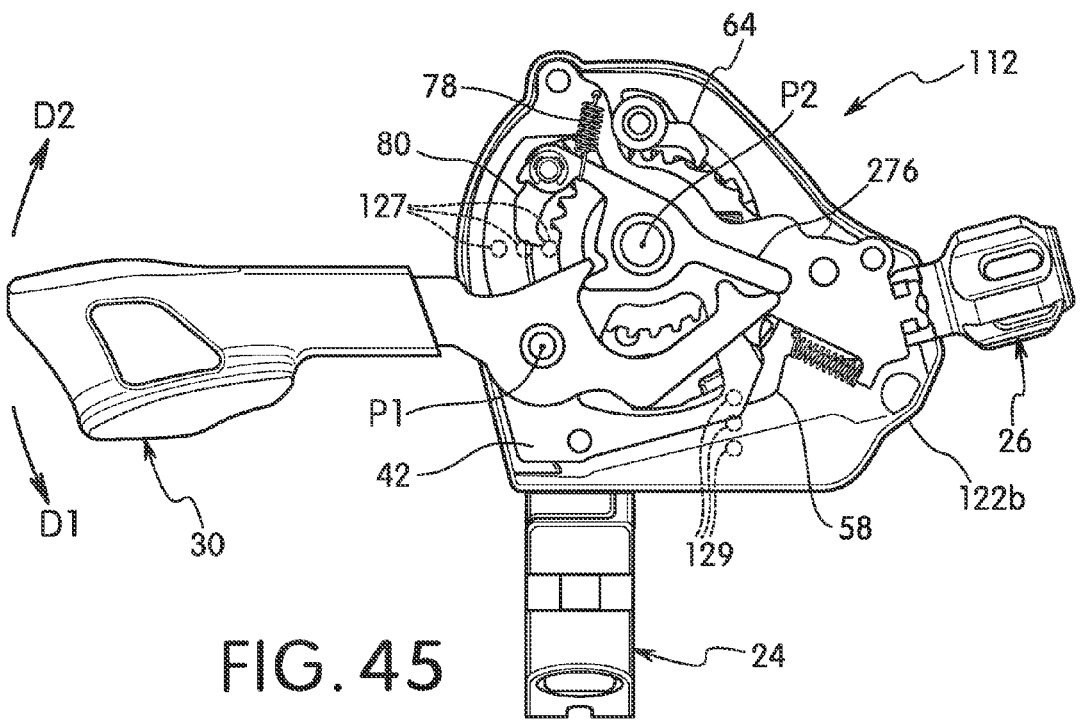
FIG. 45 is a bottom plan view of the right bicycle operating device illustrated in FIG. 44, but with the bottom housing part removed and the possible positions of the stop members shown in broken lines.

Referring now to FIGS. 44 and 45, a bicycle operating device 112 is illustrated in accordance with a second embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Here, in this second embodiment, all the parts are identical to the first embodiment, except that a modified bottom housing part 122c and a modified control member 176 replaces the bottom housing part 22c and the control member 76 of the first embodiment. In particular, the control member 176 has been modified so that the first end position of the first operating member 30 is no longer established by the contact between the control member 176 and the first operating member 30. In other words, the stop part 76c of the control member 76 has been eliminated from the control member 176. Rather, the bottom housing part 122c is provided with a plurality of first stop pin receiving openings 123 and a plurality of second stop pin receiving openings 125. The first stop pin receiving openings 123 selectively receive a first stop pin or member 127 via a snap-fit. The second stop pin receiving openings 125 selectively receive a second stop pin or member 129 via a snap-fit. Alternatively, the first and second stop pin receiving openings 123 and 125 can be threaded holes and the first and second stop members 127 and 129 can be screws.

With this arrangement, the rider can change the number holding positions that can be changed in a single progressive movement of the first operating member 30 by installing the first and second stop members 127 and 129 in different ones of the openings 123 and 125. In other words, the first stop member 127 is adjustably coupled to the fixed member 20 between a plurality of different positions by selectively installing the first stop member 127 in one of the first stop pin receiving openings 123. FIG. 45 shows the different positions of the first and second stop members 127 and 129 in broken lines. Thus, the first end position of the first operating member 30 is selectively established based on the position of the first stop member 127 with respect to the bottom housing part 122c (i.e., which one of the first stop pin receiving openings 123 has the first stop member 127). Similarly, the second stop member 129 is adjustably coupled to the fixed member 20 between a plurality of different positions by selectively installing the second stop member 129 in one of the second stop pin receiving openings 125. Thus, the second end position of the first operating member 30 is selectively established based on the position of the second stop member 129 with respect to the bottom housing part 122c (i.e., which one of the second stop pin receiving openings 125 has the second stop member 129).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle operating device. Accordingly, these terms, as utilized to describe the bicycle operating device should be interpreted relative to a bicycle equipped with the bicycle operating device as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
a fixed member configured to be attached to a bicycle;
a movable member movably coupled to the fixed member;
a position maintaining arrangement operatively arranged with respect to the movable member and the fixed member such that the position maintaining arrangement selectively maintains the movable member in any one of a plurality of holding positions relative to the fixed member;
a moving arrangement operatively coupled to the position maintaining arrangement to selectively move the movable member in a first moving direction such that the movable member moves from a current holding position to another one of the plurality of holding positions; and
first operating member movably mounted with respect to the fixed member such that the first operating member moves in a first operating direction from a rest position to a first end position and such that the first operating member moves in a second operating direction from the rest position to a second end position,
the first operating member moving the movable member by a first predetermined number of the plurality of holding positions in the first moving direction as the first operating member moves from the rest position to the first end position, the first operating member moving the movable member by a second predetermined number of the plurality of holding positions in the first moving direction as the first operating member moves from the rest position to the second end position, the first predetermined number being different from the second predetermined number.

2. The bicycle operating device according to claim 1, wherein
the position maintaining arrangement and the moving arrangement are arranged such that the first operating member moves the movable member by one of the plurality of holding positions as the first operating member is moved from the rest position to an intermediate position between the rest position and the second end position and such that the first operating member moves the movable member by at least two of the plurality of holding positions in the first moving direction as the first operating member is moved from the rest position to the second end position.

3. The bicycle operating device according to claim 2, wherein
the position maintaining arrangement and the moving arrangement are arranged such that the first operating member moves the movable member by one of the plurality of holding positions in the first moving direction as the first operating member is moved from the rest position to the first end position.

4. The bicycle operating device according to claim 1, wherein
the first operating member is pivotally mounted to the fixed member around a first pivot axis in the first and second operating directions, and the first operating direction is opposite to the second operating direction with respect to the first pivot axis.

5. The bicycle operating device according to claim 4, wherein
the moving arrangement includes a control member rotatably mounted on a second pivot axis that is offset from the first pivot axis of the first operating member, the first operating member having a first contact portion and a second contact portion, the first and second contact portions contacting the control member to rotate the control member in a same rotational direction about the second pivot axis as the first operating member pivots from the rest position to the first and second end positions.

6. The bicycle operating device according to claim 5, wherein
the control member includes a stop part that establishes the first end position of the first operating member by the stop part contacting the first operating member as the first operating member pivots from the rest position to the first end position.

7. The bicycle operating device according to claim 6, wherein
the moving arrangement further includes a first pawl mounted on the control member and a release member having a plurality of first abutments and a plurality of second abutments, the first pawl selectively engaging one of the first abutments and rotating the release member such that one of the second abutments moves the position maintaining arrangement as the first operating member pivots from the rest position to the first and second end positions.

8. The bicycle operating device according to claim 7, wherein
the position maintaining arrangement includes a second pawl and a positioning member having a plurality of third abutments, the second pawl selectively engaging the third abutments to maintain the movable member in any one of the plurality of holding positions relative to the fixed member; and the first pawl selectively engages one of the first abutments and rotates the release member such that one of the second abutments moves the second pawl out of engagement from one of the third abutments as the first operating member pivots from the rest position to the first and second end positions.

9. The bicycle operating device according to claim 4, wherein the fixed member includes a tubular mounting member having a handlebar mounting axis.

10. The bicycle operating device according to claim 9, wherein the first pivot axis of the first operating member is arranged relative to the handlebar mounting axis of the tubular mounting member such that a rider actuating portion of the first operating member moves closer to the handlebar mounting axis of the tubular mounting member as the first operating member is moved from the rest position to the first end position.

11. The bicycle operating device according to claim 4, wherein the movable member is mounted on a second pivot axis that is offset from the first pivot axis of the first operating member.

12. The bicycle operating device according to claim 1, further comprising a second operating member operatively coupled to the position maintaining arrangement to move the movable member in a second moving direction, which is opposite to the first moving direction of the movable member, as the second operating member moves relative to the fixed member.

13. The bicycle operating device according to claim 12, wherein the movable member and the second operating member are mounted on a second pivot axis that is offset from a first pivot axis of the first operating member.

14. The bicycle operating device according to claim 1, further comprising a first stop member adjustably coupled to the fixed member between at least two different positions, the first end position of the first operating member being established based on the position of the first stop member.

15. The bicycle operating device according to claim 14, further comprising a second stop member adjustably coupled to the fixed member between at least two different positions, the second end position of the first operating member being established based on the position of the second stop member.

* * * * *